United States Patent
Norieda et al.

(10) Patent No.: US 10,296,101 B2
(45) Date of Patent: May 21, 2019

(54) INFORMATION PROCESSING SYSTEM, INFORMATION PROCESSING APPARATUS, CONTROL METHOD, AND PROGRAM

(71) Applicant: NEC Corporation, Minato-ku, Tokyo (JP)

(72) Inventors: Shin Norieda, Tokyo (JP); Makoto Yoshimoto, Tokyo (JP); Yoshinori Saida, Tokyo (JP); Hiroki Kosuge, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/760,275

(22) PCT Filed: Feb. 8, 2017

(86) PCT No.: PCT/JP2017/004491
§ 371 (c)(1),
(2) Date: Mar. 15, 2018

(87) PCT Pub. No.: WO2017/138545
PCT Pub. Date: Aug. 17, 2017

(65) Prior Publication Data
US 2018/0267619 A1 Sep. 20, 2018

(30) Foreign Application Priority Data
Feb. 8, 2016 (JP) .................. 2016-021575

(51) Int. Cl.
*G06F 3/01* (2006.01)
*G06F 3/0346* (2013.01)
(Continued)

(52) U.S. Cl.
CPC .............. *G06F 3/017* (2013.01); *G06F 3/01* (2013.01); *G06F 3/0346* (2013.01);
(Continued)

(58) Field of Classification Search
None
See application file for complete search history.

(56) References Cited

U.S. PATENT DOCUMENTS

2004/0095311 A1* 5/2004 Tarlton .................. G06F 3/016
345/156
2012/0314902 A1* 12/2012 Kimura .............. G06K 9/00355
382/103
(Continued)

FOREIGN PATENT DOCUMENTS

JP 2006-506737 A 2/2006
JP 2009-104429 A 5/2009
(Continued)

OTHER PUBLICATIONS

Japanese Office Action for JP Application No. 2017-566966 dated Apr. 17, 2018 with English Translation.
(Continued)

*Primary Examiner* — Kenneth B Lee, Jr.

(57) ABSTRACT

A marker (3020) is any part of a user's body or is any mark attached to the user. A sensor (3040) is attached to the user. An operation region calculation unit (2020) calculates an operation region included in a captured image on the basis of a position of the marker (3020) included in the captured image generated by a camera. A recognition unit (2040) calculates a position or motion of an operation body captured in the operation region, and recognizes an input operation on the basis of the calculated position or motion of the operation body. Note that the recognition unit (2040) calculates a position of the operation body captured in the operation region at a timing based on a result of detection by the sensor (3040). The recognition unit (2040) calculates motion of the operation body captured in the operation
(Continued)

region in a period including a timing based on a result of detection by the sensor (3040).

8 Claims, 27 Drawing Sheets

(51) Int. Cl.
*G06K 9/00* (2006.01)
*G06T 7/20* (2017.01)
*G06F 3/042* (2006.01)

(52) U.S. Cl.
CPC ....... *G06F 3/0425* (2013.01); *G06K 9/00355* (2013.01); *G06T 7/20* (2013.01); *G06T 2207/10016* (2013.01); *G06T 2207/30196* (2013.01); *G06T 2207/30204* (2013.01)

(56) References Cited

U.S. PATENT DOCUMENTS

| | | | | |
|---|---|---|---|---|
| 2014/0172231 A1* | 6/2014 | Terada | ................... | G06F 3/005 701/36 |
| 2015/0016777 A1* | 1/2015 | Abovitz | ............... | G02B 27/225 385/37 |
| 2015/0261409 A1* | 9/2015 | Tanaka | .................... | G06F 3/017 715/856 |
| 2016/0170485 A1* | 6/2016 | Naruse | .................. | B60K 35/00 345/8 |

FOREIGN PATENT DOCUMENTS

| | | |
|---|---|---|
| JP | 2011-257943 A | 12/2011 |
| JP | 2012-256098 A | 12/2012 |
| JP | 2014-119295 A | 6/2014 |
| JP | 2014-218199 A | 11/2014 |
| JP | 2015-504616 A | 2/2015 |
| JP | 2015-060268 A | 3/2015 |
| JP | 2015-172886 A | 10/2015 |

OTHER PUBLICATIONS

International Search Report for PCT Application No. PCT/JP2017/004491, dated Mar. 7, 2017.
English translation of Written opinion for PCT Application No. PCT/JP2017/004491.

\* cited by examiner

FIG. 14
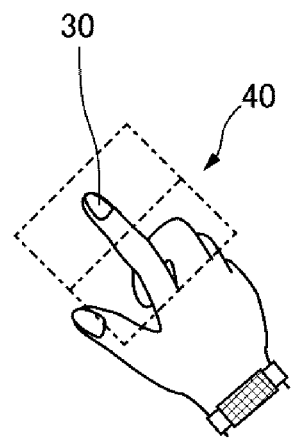
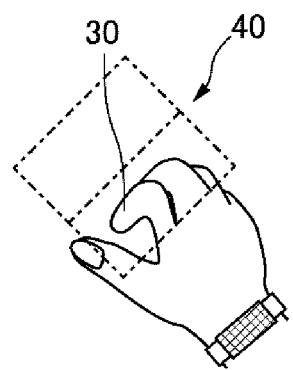

INFORMATION PROCESSING SYSTEM, INFORMATION PROCESSING APPARATUS, CONTROL METHOD, AND PROGRAM

This application is a National Stage Entry of PCT/JP2017/004491 filed on Feb. 8, 2017, which claims priority from Japanese Patent Application 2016-021575 filed on Feb. 8, 2016, the contents of all of which are incorporated herein by reference, in their entirety.

TECHNICAL FIELD

The present invention relates to an information processing system, an information processing apparatus, a control method, and a program.

BACKGROUND ART

A technique has been developed in which an action such as gesture input performed on a space by a user is imaged by a camera, a generated captured image is analyzed, and thus the user's input operation on an information processing apparatus is recognized. Patent Document 1 discloses a technique in which a menu screen is displayed on the palm or the menu screen is changed according to a gesture of the palm of a user (for example, a gesture of opening the palm).

Patent Document 2 discloses a technique of performing input by using a virtual keyboard displayed on a head mounted display. Patent Document 2 discloses a technique in which the virtual keyboard is fixed to an object on a real space, and thus a position of the virtual keyboard is not changed even if the head of a person wearing the head mounted display is moved.

RELATED DOCUMENT

Patent Document

[Patent Document 1] U.S. Patent Application Publication No. 2015/0016777

[Patent Document 2] PCT Japanese Translation Patent Publication No. 2015-504616

SUMMARY OF THE INVENTION

Technical Problem

In a case of analyzing motion of the hand of a user included in a captured image, it is hard to differentiate a case where the user is moving the hand for an input operation from a case where the user is moving the hand for another purpose. Thus, there is a probability that an input operation may be wrongly recognized despite the user not performing the input operation, or an input operation may not be recognized despite the user performing the input operation.

The present invention has been made in light of the problem. An object of the present invention is to provide a technique of improving the recognition accuracy when a user's input operation is recognized from a captured image.

Solution to Problem

According to the present invention, there is provided an information processing system including 1) a marker that is attached to a user or is a part of the body of the user; 2) a sensor that is mounted on the user; and 3) an information processing apparatus.

The information processing apparatus includes 1) an operation region calculation unit calculating an operation region included in a captured image on the basis of a position of the marker included in the captured image generated by a camera, and 2) a recognition unit detecting a position of an operation body captured in the operation region at a timing based on a result of detection by the sensor or detecting motion of the operation body captured in the operation region in a period including the timing, and recognizing an input operation on the basis of the detected position or motion.

According to the present invention, there is provided an information processing apparatus that is the information processing apparatus included in the information processing system of the present invention.

According to the present invention, there is provided a control method executed by a computer. The control method includes 1) an operation region calculation step of calculating an operation region included in a captured image on the basis of a position of a marker included in the captured image generated by a camera; and 2) a recognition step of detecting a position of an operation body captured in the operation region at a timing based on a result of detection by a sensor or detecting motion of the operation body captured in the operation region in a period including the timing, and recognizing an input operation on the basis of the detected position or motion, 3) The marker is attached to a user or is a part of the body of the user, and 4) the sensor is attached to the user.

According to the present invention, there is provided a program causing a computer to execute each of the steps included in the control method of the present invention.

Advantageous Effects of Invention

According to the present invention, there is provided a technique of improving the recognition accuracy when a user's input operation is recognized from a captured image.

BRIEF DESCRIPTION OF THE DRAWINGS

The above-described object, and other objects, features and advantages will become more apparent on the basis of preferred embodiments described below and the following accompanying drawings.

FIG. 14 are diagrams illustrating operations defined by a position of an operation body.

DESCRIPTION OF EMBODIMENTS

Figure 1:
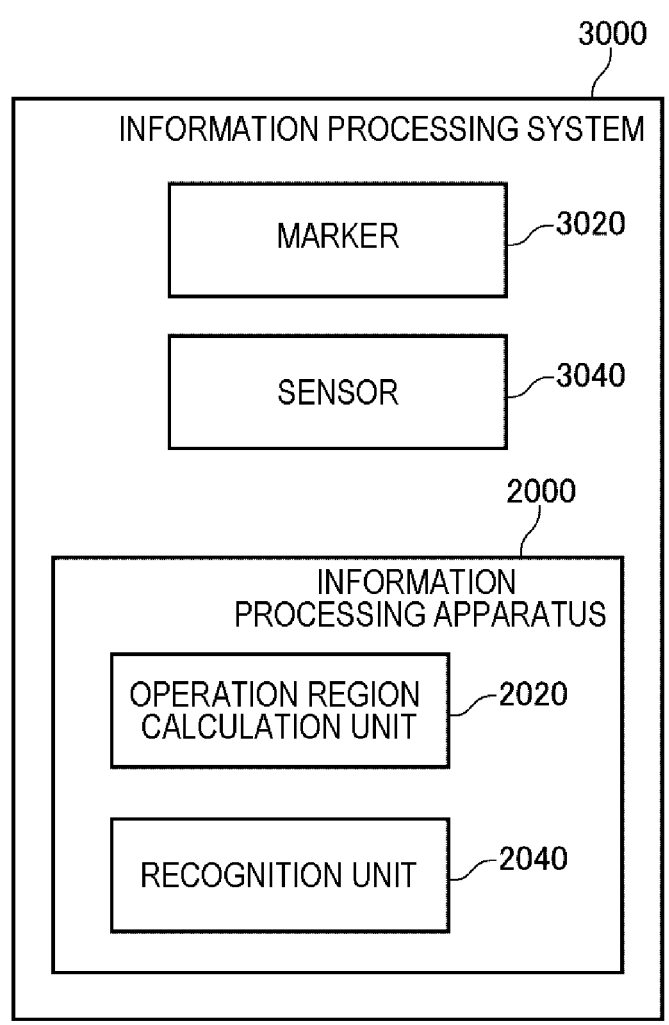
FIG. 1 is a block diagram illustrating an information processing system according to Example Embodiment 1.

Hereinafter, example embodiments of the present invention will be described with reference to the drawings. The same constituent elements are given the same reference numerals throughout all the drawings, and description thereof will not be repeated as appropriate. In each block diagram, unless particularly mentioned, each block indicates not a configuration in the hardware unit but a configuration in the functional unit.

Example Embodiment 1

FIG. 1 is a block diagram illustrating an information processing system 3000 according to Example Embodiment 1. The information processing system 3000 includes a marker 3020, a sensor 3040, and an information processing apparatus 2000. The marker 3020 is any part of the body of a user of the information processing system 3000, or any mark attached to the user of the information processing system 3000. The sensor 3040 is a sensor attached to the user of the information processing system 3000. For example, the sensor 3040 is a vibration sensor. Details of the marker 3020 or the sensor 3040 will be described later.

An information processing apparatus 2000 includes an operation region calculation unit 2020 and a recognition unit 2040. The operation region calculation unit 2020 calculates an operation region included in a captured image on the basis of a position of the marker 3020 included in the captured image generated by a camera.

The recognition unit 2040 calculates a position or motion of an operation body included in the operation region on the captured image. The operation body is any object used for an operation by the user. For example, the operation body is a part (the finger or the like) of the user's body or an object (a pen or the like) held by the user's body. Here, a position of an operation body calculated by the recognition unit 2040 is a position of the operation body captured in an operation region at a timing based on a result of detection by the sensor 3040. Motion of the operation body calculated by the recognition unit 2040 is motion of the operation body captured in an operation region in a period including a timing based on a result of detection by the sensor 3040.

The recognition unit 2040 recognizes an input operation on the basis of the calculated position or motion of the operation body. A target of the input operation may be the information processing apparatus 2000 or other apparatuses.

Figure 2:
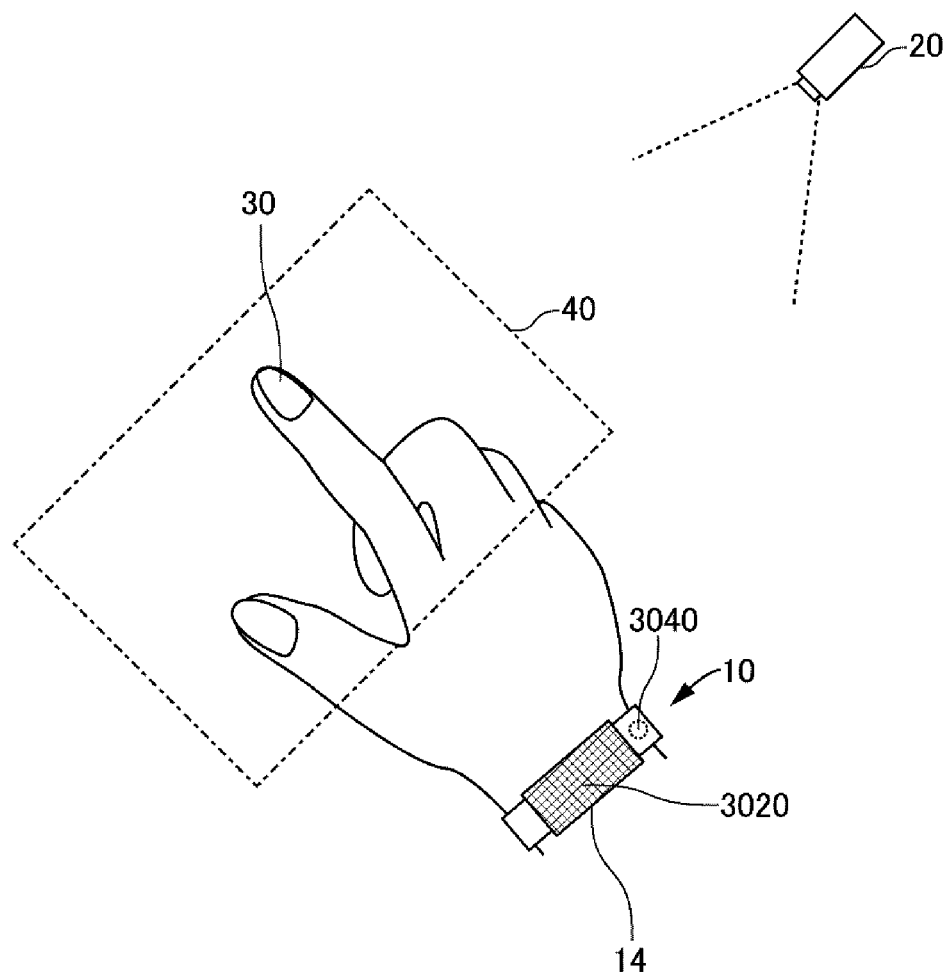
FIG. 2 is a diagram for conceptually explaining the information processing system.

FIG. 2 is a diagram for conceptually explaining the information processing system 3000. In the example illustrated in FIG. 2, a watch type device 10 is mounted on the wrist of the user using the information processing system 3000. The marker 3020 is an image (hereinafter, a marker image) displayed on a touch panel 14 of the device 10.

The marker 3020 is imaged by a camera 20. The operation region calculation unit 2020 calculates an operation region 40 on the basis of a position of the marker 3020 included in a captured image generated by the camera 20.

The information processing apparatus 2000 uses the sensor 3040 attached to the user for recognition of an input operation performed by the user. In FIG. 2, the sensor 3040 is a vibration sensor built into the device 10. For example, if the user taps any location with the finger 30 when the user performs an input operation, vibration caused by the tapping is detected by the sensor 3040. In the above-described way, the recognition unit 2040 can recognize that a position of the finger 30 at a timing at which vibration is detected by the sensor 3040 or motion of the finger 30 in a period including a timing at which vibration is detected by the sensor 3040 indicates an input operation. Therefore, the recognition unit 2040 can accurately recognize an input operation intended by the user by calculating a position or motion of the finger 30 on the basis of the timing.

Here, the recognition unit 2040 detects the finger 30 from the inside of the operation region 40. In the above-described way, an image region on which image processing is to be performed in order to detect the finger 30 can be reduced. Therefore, the time required for recognition of an input operation is reduced.

Note that an operation of the information processing apparatus 2000 described with reference to FIG. 2 is an example for better understanding of the information processing apparatus 2000, and an operation of the information processing apparatus 2000 is not limited to the above-described example. Details or variations of an operation of the information processing apparatus 2000 will be described later.

Advantageous Effects

If a user's input operation is to be recognized by using only a position or motion of an operation body included in a captured image, it is hard to detect the fact that the input operation is performed. Thus, there is a probability that an input operation may be wrongly recognized despite the user not performing the input operation, or an input operation may not be recognized despite the user performing the input operation.

Therefore, the information processing apparatus 2000 of the present example embodiment recognizes an input operation by analyzing a position of the operation body at a timing based on a result of detection by the sensor 3040 attached to the user, or motion of the operation body in a period including a timing based on a result of detection by the sensor 3040. Thus, in a case where the user performs an input operation such that the sensor 3040 performs detection during the input operation, there is a high probability that the position or the motion of the operation body based on the timing may indicate the user's input operation. Thus, an input operation intended by the user can be accurately recognized, and thus it is possible to prevent an input operation from being wrongly recognized despite the user not performing the input operation, or an input operation from not being recognized despite the user performing the input operation.

The information processing apparatus 2000 of the present example embodiment calculates the operation region 40 on the basis of a position of the marker 3020 included in a captured image generated by the camera 20. The recognition unit 2040 calculates a position or motion of an operation body from the inside of the operation region 40. In the above-described way, it is possible to reduce an image region on which image processing is to be performed in order to calculate the operation body, and thus the time required for recognition of an input operation is reduced.

Hereinafter, the information processing apparatus 2000 of the present example embodiment will be described more in detail.

<Example of Hardware Configuration of Information Processing Apparatus 2000>

Each functional configuration unit of the information processing apparatus 2000 may be realized by hardware (for example, a hardware electronic circuit) realizing each functional unit, and may be realized by a combination of hardware and software (for example, a combination of an electronic circuit and a program for controlling the electronic circuit). Hereinafter, a further description will be made of a case where each functional configuration unit of the information processing apparatus 2000 is realized by a combination of hardware and software.

A computer 1000 is various computers. For example, the computer 1000 is a personal computer (PC), a server machine, a tablet terminal, or a smart phone. The computer 1000 may be a computer controlling various devices mounted on various vehicles (an automobile, a train, an aircraft, or the like). The computer 1000 may be a special purpose computer designed to realize the information processing apparatus 2000, and may be a general purpose computer.

Figure 3:
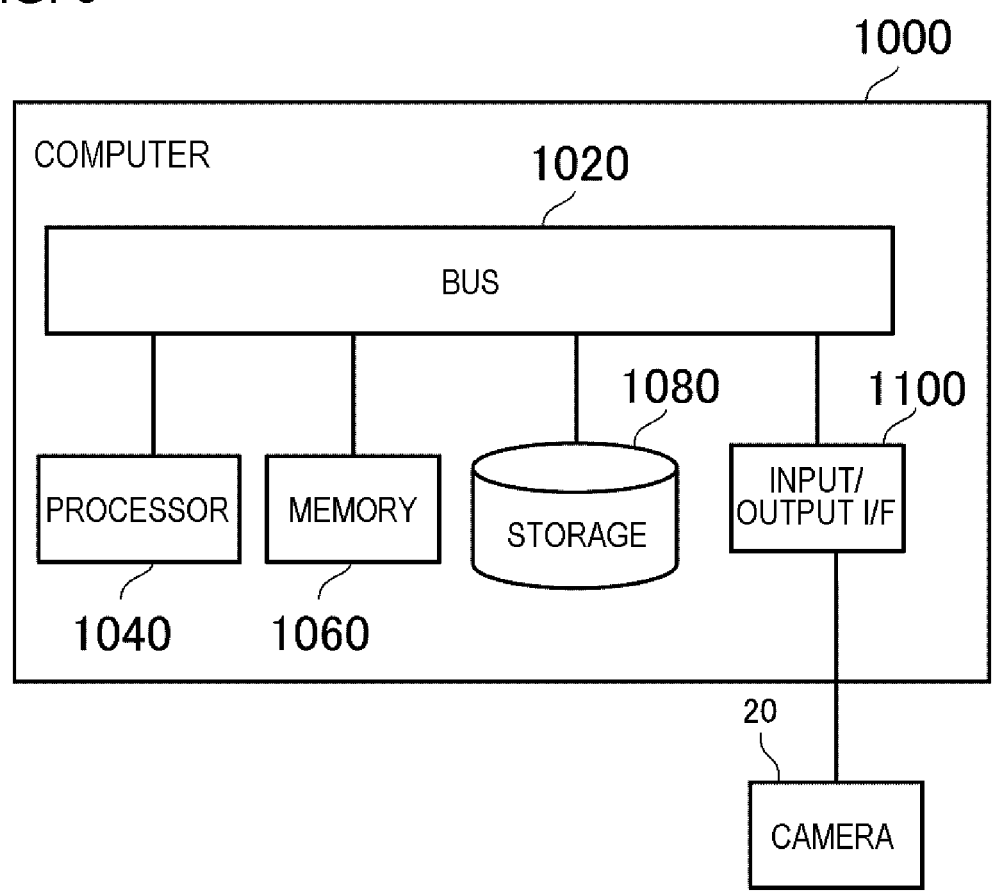
FIG. 3 is a diagram illustrating a configuration of a computer realizing an information processing apparatus.

FIG. 3 is a diagram illustrating a configuration of the computer 1000 realizing the information processing apparatus 2000. The computer 1000 includes a bus 1020, a processor 1040, a memory 1060, a storage 1080, and an input/output interface 1100. The bus 1020 is a data transmission path for transmitting and receiving data among the processor 1040, the memory 1060, and the storage 1080. However, a method of connecting the processor 1040 and the like to each other is not limited to connection using a bus. The processor 1040 is, for example, a calculation processing device such as a central processing unit (CPU) or a graphics processing unit (GPU). The memory 1060 is, for example, a random access memory (RAM) or a read only memory (ROM). The storage 1080 is, for example, a storage device such as a hard disk, a solid state drive (SSD), or a memory card. The storage 1080 may be a memory such as a RAM or a ROM.

The input/output interface 1100 connects the computer 1000 to input and output devices. In FIG. 3, the input/output interface 1100 is connected to the camera 20. The camera 20 is any camera which repeatedly performs imaging, and generates a captured image indicating each imaging result. Note that the camera 20 may be a two-dimensional (2D) camera, and may be a three-dimensional (3D) camera.

The camera 20 is provided at any position. For example, the camera 20 is provided in the periphery of a location where the user uses the information processing system 3000. In a case where an input operation target recognized by the recognition unit 2040 is a device (for example, an air conditioner) provided in a vehicle, the camera 20 is provided in the vicinity of a location on which the user sits in the vehicle. For example, in a case where the user is a driver or a pilot of the vehicle, the camera 20 is provided in the periphery (for example, over a driver's seat or a cockpit) of the driver's seat or the cockpit.

For example, the camera 20 may be attached to an object attached to the user. The object attached to the user is, for example, clothes of the user, an employee ID card held from the neck of the user, or a head mounted display.

The storage 1080 stores a program module for realizing each function of the information processing apparatus 2000. The processor 1040 executes each program module so as to realize each function corresponding to the program module.

A hardware configuration of the computer 1000 is not limited to the configuration illustrated in FIG. 3. For example, each program module may be stored in the memory 1060. In this case, the computer 1000 may not include the storage 1080. However, a method of connecting the camera 20 to the computer 1000 is not limited to a connection method using the input/output interface 1100. For example, the camera 20 may be connected to the computer 1000 through a network. In this case, the computer 1000 includes a network interface for connection to the network.

<<Sensor 3040>>

The sensor 3040 is any sensor which can be used to recognize a timing of an input operation performed by the user. For example, the sensor 3040 is the above-described vibration sensor. The vibration sensor may be provided at any location. For example, the vibration sensor is provided in the device 10 as described above. For example, the vibration sensor may be bonded to the arm or the hand of the user, or may be provided on clothes (a sleeve of the clothes) of the user.

In a case where the sensor 3040 is the vibration sensor, the user applies vibration to a location where the sensor 3040 is attached or the vicinity thereof at a timing at which an input operation is performed or a timing close thereto. For example, the user applies vibration to any location of the left arm portion by using the right hand in a state where the device 10, into which the vibration sensor is built, is attached to the left wrist. As a result, vibration is applied to the vibration sensor, and thus the vibration is detected by the vibration sensor.

For example, the user applies vibration to another location by using a part to which the sensor 3040 is attached at a timing at which an input operation is performed or a timing close thereto. For example, the user applies vibration to any location (for example, a desk) by using the right hand in a state where the device 10, into which the vibration sensor is built, is attached to the right wrist. As a result, the vibration is transmitted to the vibration sensor, and thus the vibration is detected by the vibration sensor.

Note that the sensor 3040 is not limited to a vibration sensor. The sensor 3040 may be, for example, a pressure sensor or an electrostatic capacitance sensor. The pressure sensor or the electrostatic capacitance sensor may be provided at any location. The pressure sensor or the electrostatic capacitance sensor is provided on, for example, the touch panel of the device 10. For example, the pressure sensor or the electrostatic capacitance sensor may be provided on a sheet or the like bonded to or wound on the arm of the user. For example, the pressure sensor or the electrostatic capacitance sensor may be provided on clothes (sleeves of clothes or the like) of the user.

In a case where the sensor 3040 is the electrostatic capacitance sensor, the user touches a location to which the sensor 3040 is attached. Consequently, a change in electrostatic capacitance is detected by the electrostatic capacitance sensor. For example, in a case where the sensor 3040 is the pressure sensor, the user applies pressure to a location to which the sensor 3040 is attached. Consequently, the pressure is detected by the pressure sensor.

Note that an action (for example, an action of applying vibration) for causing the sensor 3040 to perform detection may be performed by using an operation body, and may be performed by using objects other than an operation body.

<Flow of Process>

Figure 4:
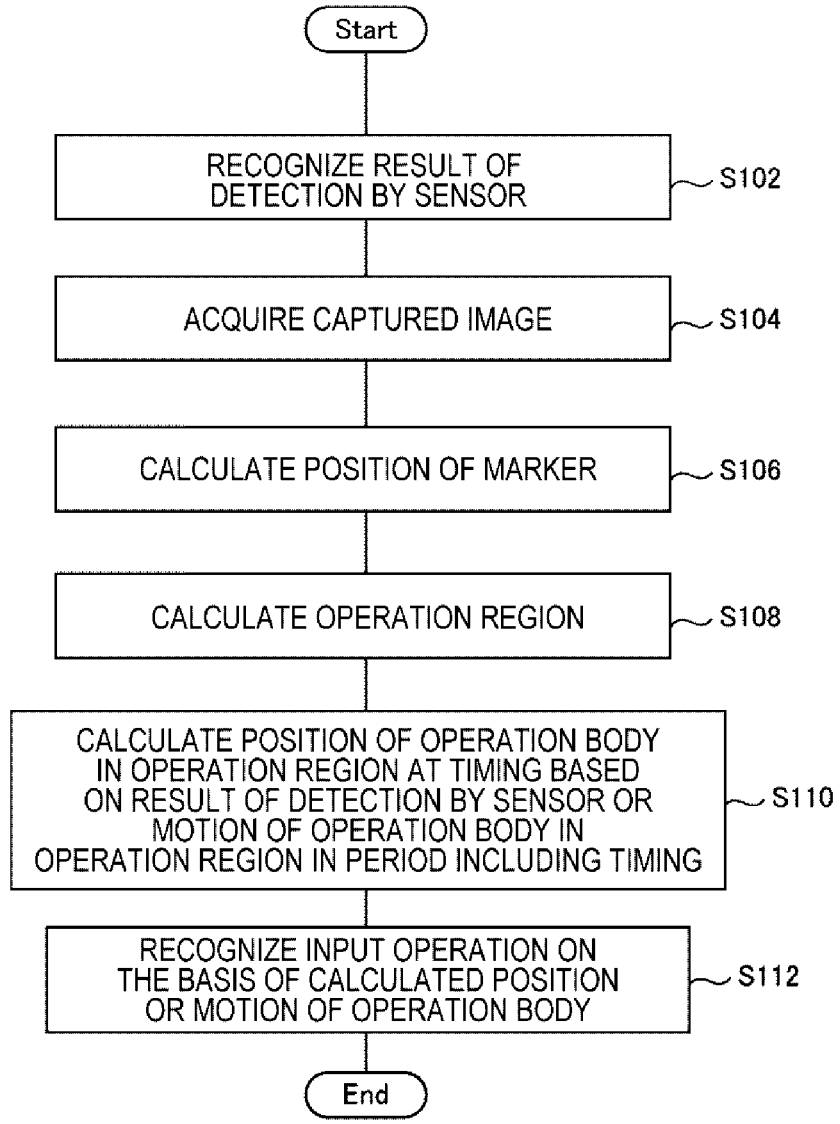
FIG. 4 is a flowchart illustrating a flow of processes performed by the information processing apparatus of Example Embodiment 1.

FIG. 4 is a flowchart illustrating a flow of processes performed by the information processing apparatus 2000 of Example Embodiment 1. The information processing apparatus 2000 recognizes a result of detection by the sensor 3040 (S102). The information processing apparatus 2000 acquires a captured image (S104). The operation region calculation unit 2020 calculates a position of the marker 3020 included in the captured image (S106). The operation region calculation unit 2020 calculates an operation region included in the captured image on the basis of the calculated position of the marker 3020 (S108). The recognition unit 2040 calculates a position of an operation body in the operation region at a timing based on the result of detection by the sensor 3040, or motion of the operation body in the operation region in a period including the timing (S110). The recognition unit 2040 recognizes an input operation on the basis of the calculated position or motion of the operation body (S112).

Note that a flow of processes performed by the information processing apparatus 2000 is not limited to the flow illustrated in FIG. 4. For example, the recognition (S102) of a result of detection by the sensor 3040 may be performed after the acquisition (S104) of a captured image or the calculation (S106) of a position of the marker 3020.

<Method of Acquiring Captured Image: S102>

The information processing apparatus 2000 acquires a captured image generated by the camera 20 (S104). There are various methods of the information processing apparatus 2000 acquiring a captured image. For example, the information processing apparatus 2000 acquires a captured image from the camera 20. In this case, the information processing apparatus 2000 is communicably connected to the camera 20.

In a case where the camera 20 stores a captured image in an external storage device, the information processing apparatus 2000 acquires the captured image from the storage device. In this case, the information processing apparatus 2000 is communicably connected to the storage device.

Note that the information processing apparatus 2000 may acquire all captured images generated by the camera 20, or may acquire only some thereof. In the latter case, for example, the information processing apparatus 2000 acquires only an operation image used for the recognition unit 2040 to recognize a position or motion of the operation body. Note that, as will be described later, the operation image used for the recognition unit 2040 to recognize a position or motion of the operation body is defined at a timing based on a result of detection by the sensor 3040.

<Method of Recognizing Detection Result in Sensor 3040: S104>

The information processing apparatus 2000 recognizes a result of detection by the sensor 3040 (S104). There are various methods in which the information processing apparatus 2000 recognizes a result of detection by the sensor 3040. Hereinafter, the methods will be described.

<<Use of Wireless Communication>>

For example, the information processing apparatus 2000 performs wireless communication with the device 10 having the sensor 3040 built thereinto so as to acquire information indicating a result of detection by the sensor 3040. The information processing apparatus 2000 recognizes the result of detection by the sensor 3040 by using the information.

For example, the device 10 transmits a predetermined signal to the information processing apparatus 2000 at a timing at which the sensor detects vibration of a predetermined magnitude or more. In this case, the information processing apparatus 2000 can acquire the result of detection by the sensor that "vibration has been detected by the sensor 3040" by receiving the predetermined signal.

For example, in a case where vibration of a predetermined magnitude or more is detected by the sensor 3040, the device 10 may transmit information indicating a time point at which the vibration is detected, to the information processing apparatus 2000.

<<Detection of Change in Appearance of Device 10>>

The device 10 may change appearance of the device 10 according to detection of vibration in the sensor 3040. In this case, the information processing apparatus 2000 recognizes a result of detection by the sensor 3040 (detection of the vibration in the sensor 3040) by detecting a change in the appearance of the device 10 by using a captured image generated by the camera 20.

Figure 5:
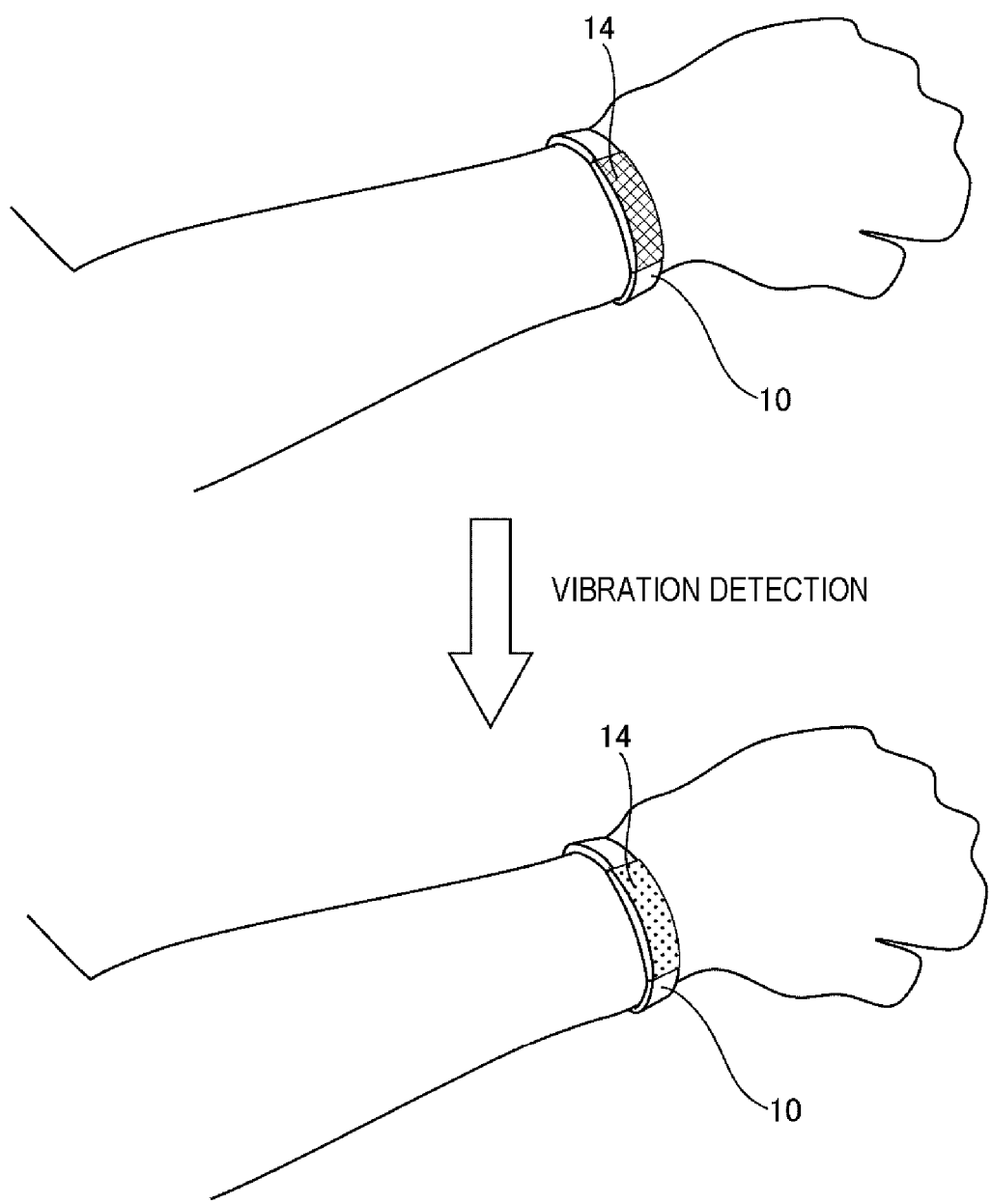
FIG. 5 is a diagram illustrating a scene in which an image displayed on a display of a device is changed when vibration is detected by a sensor.

For example, in a case where the device 10 includes a display, the device 10 changes display on the display when vibration of a predetermined magnitude or more is detected by the sensor 3040. More specifically, when vibration of the predetermined magnitude or more is detected by the sensor 3040, the device 10 changes an image displayed on the display of the device 10 or displays a new image on the display on which nothing has been displayed. The information processing apparatus 2000 detects a change in display on the display of the device by analyzing captured images which are repeatedly generated by the camera 20. Consequently, the information processing apparatus 2000 recognizes that the vibration has been detected by the sensor. FIG. 5 is a diagram illustrating a scene in which an image displayed on the display of the device 10 is changed in a case where vibration is detected by the sensor 3040.

For example, in a case where vibration is detected by the sensor 3040, the device 10 may turn on or flash a light such as a backlight of the display of the device 10 or a light emitting diode (LED) light provided in the device 10. The information processing apparatus 2000 detects turning-on or flashing of the light by analyzing captured images repeatedly generated by the camera 20. Consequently, the information processing apparatus 2000 recognizes that the vibration has been detected by the sensor 3040.

As mentioned above, if the information processing apparatus 2000 recognizes detection of vibration by changing the appearance of the device 10 according to the detection of the vibration in the sensor 3040, it is not necessary to perform wireless communication between the device 10 and the information processing apparatus 2000. Thus, the device 10 or the information processing apparatus 2000 may not have a wireless communication function as long as wireless communication is not necessary for other purposes.

A method in which the information processing apparatus 2000 recognizes a detection result in sensors other than the vibration sensor is the same as the method described for the vibration sensor. For example, in a case where the sensor is a pressure sensor, when the pressure sensor detects pressure of a predetermined magnitude or more, the device 10 or the information processing apparatus 2000 performs the same process as when the vibration sensor detects vibration of a predetermined magnitude or more. For example, in a case where the sensor is an electrostatic capacitance sensor, when the electrostatic capacitance sensor detects displacement of electrostatic capacitance of a predetermined magnitude or more, the device 10 or the information processing apparatus 2000 performs the same process as when the vibration sensor detects vibration of a predetermined magnitude or more.

<Marker 3020>

The marker 3020 is any mark of which at least a position can be determined in a captured image generated by the camera 20. For example, the marker 3020 is a marker which can be used for determination of a three-dimensional coordinate system. A marker which can be used for determination of a three-dimensional coordinate system is, for example, an augmented reality (AR) marker. However, a marker which can be used for determination of a three-dimensional coordinate system may be a marker causing three directions orthogonal to each other from a certain reference point to be obtained in a constant manner, and is not limited to the AR marker. The marker 3020 is not necessarily used for determination of a three-dimensional coordinate system as long as a position thereof can be determined in a captured image.

In a case where the marker 3020 is attached to the user's body, the marker 3020 may be attached to any location of the user's body. For example, the marker is attached to the arm portion of the user. Here, the arm portion indicates a part from the hand to the shoulder.

For example, in this case, the marker is an image displayed on the display of the device attached to the user's arm portion. The device 10 is any electronic device having a function of displaying an image on the display. Note that the device 10 may be directly attached to the arm of the user, or may be attached to the arm of the user through clothes.

For example, in FIG. 2, the marker 3020 is a marker image displayed on the touch panel 14 of the device 10. The marker image may be an image stored in the device 10 in advance, or may be an image stored in an external storage device of the device 10. In the latter case, the device 10 acquires the marker image from the storage device, and displays the marker image.

The marker 3020 is not limited to being displayed on the device as described above. The marker 3020 may be directly drawn on the arm portion of the user, or may be drawn on any object present on the arm portion of the user. In the latter case, for example, the marker 3020 is drawn on a ring attached to the finger of the user, a wrist band attached to on the wrist of the user, or a sleeve of clothes attached to the user. Note that the marker 3020 may be drawn by hand, or may be printed.

The marker 3020 may be a specific part of the user's body. For example, the marker 3020 is the back of the hand of the user.

Note that information indicating an object to be recognized as the marker 3020 by the operation region calculation unit 2020 may be set in the marker 3020 in advance, or may be stored in a storage device which can be accessed from the operation region calculation unit 2020.

A single object or a plurality of objects may be handled as the marker 3020 by the operation region calculation unit 2020.

<Method of Calculating Position of Marker 3020: S106>

The operation region calculation unit 2020 calculates a position of the marker 3020 included in a captured image (S106). Thus, the operation region calculation unit 2020 uses information (information regarding a shape, a size, a color, or the like of the marker 3020; hereinafter, marker information) for determining an object handled as the marker 3020. The information may be set in the operation region calculation unit 2020 in advance, or may be stored in a storage device which can be accessed from the operation region calculation unit 2020.

The operation region calculation unit 2020 detects the marker 3020 included in a captured image by using the marker information. The operation region calculation unit 2020 calculates a position of the detected marker 3020. Here, various known techniques may be used as a technique of detecting a predetermined object from the inside of an image and calculating a position of the object in the image.

<Method of Calculating Operation Region 40: S108>

The operation region calculation unit 2020 calculates the operation region 40 on the basis of the calculated position of the marker 3020 (S108). The operation region 40 is any region defined with a position of the marker 3020 as a reference. For example, the operation region 40 is a region defined in a predetermined shape having a position (for example, a central position) of the marker 3020 as a central position. The predetermined shape is any shape such as a circular shape or a rectangular shape.

Figure 6:
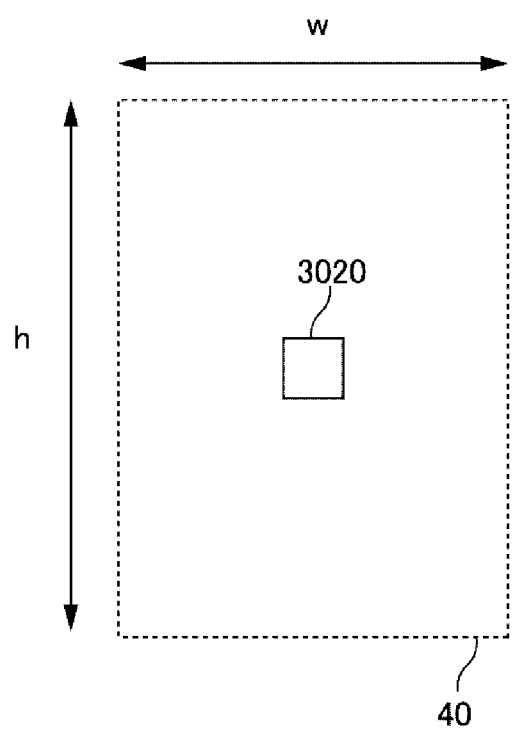
FIG. 6 is a diagram illustrating an operation region centering on a marker.

FIG. 6 is a diagram illustrating the operation region 40 centering on the marker 3020. In FIG. 6, the operation region 40 has a central position of the marker 3020 as a central position thereof, and has a rectangular shape the width of which is a predetermined length w and the height of which is a predetermined length h.

However, a position defined by a position of the marker 3020 is not limited to a central position of the operation region 40. For example, a position such as an upper left end of the operation region 40 may be defined by a position of the marker 3020.

Figure 7:
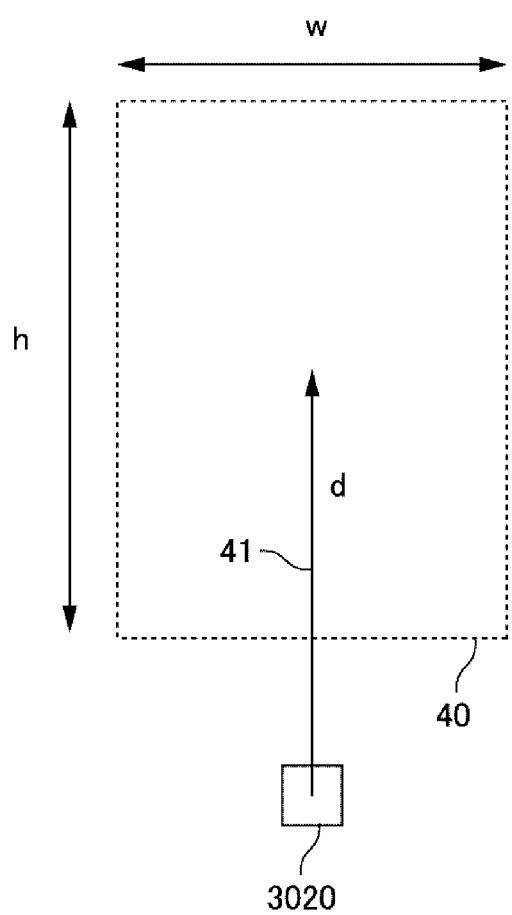
FIG. 7 is a diagram illustrating a coordinate system defined by a marker, and is a diagram illustrating an operation region having a location separated from a marker as a central position.

For example, the operation region 40 may be a region the central position or the like of which is present at a location separated from a position of the marker 3020 in a predetermined direction by a predetermined distance. FIG. 7 is a diagram illustrating the operation region 40 having a location separated from the marker 3020 as a central position thereof. A shape of the operation region 40 in FIG. 7 is the same as the shape of the operation region 40 in FIG. 6. However, the central position of the operation region 40 in FIG. 7 is a location moved by a distance d in a direction defined by an arrow 41 from the marker 3020. In FIG. 2, the operation region 40 is a region centering on a location separated from the position of the marker 3020 by a predetermined distance in the direction of the palm of the arm portion to which the marker 3020 is attached.

Figure 8:
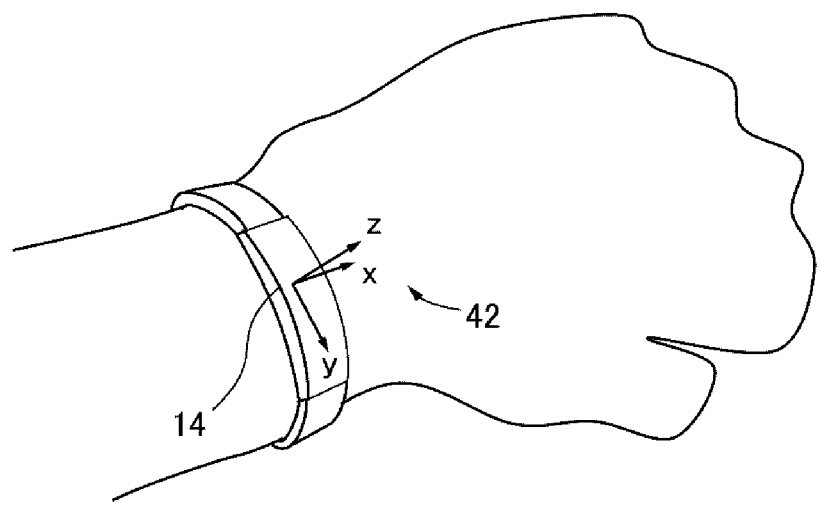
FIG. 8 is a diagram illustrating a case where a marker is a marker image displayed on a touch panel.

Note that the direction indicated by an arrow 41 may be a direction defined by a coordinate system in a captured image, and may be a direction defined by other coordinate systems. In the former case, for example, the arrow 41 indicates a direction in a coordinate system which has a rightward side of a captured image as an x axis direction, and a downward side of the captured image as a y axis direction. On the other hand, in the latter case, for example, the arrow 41 indicates a direction in coordinate system defined by the marker 3020. FIG. 7 is a diagram illustrating a coordinate system 42 defined by the marker 3020. In FIG. 8, the marker 3020 is a marker image displayed on the touch panel 14. Note that, in this case, the marker image is an AR marker which can be used for determination of a three-dimensional coordinate.

Note that information indicating a size or a shape with a predetermined range or information indicating a location (for example, information regarding the arrow 41) used as the center of the marker 3020 may be set in the operation region calculation unit 2020 in advance, or may be stored in a storage device which can be accessed from the operation region calculation unit 2020.

<Operation Body>

There are various objects handled as an operation body by the recognition unit 2040. For example, the recognition unit 2040 handles a part (finger or the like) of the user's arm portion or an object (for example, a pen) held by the user's arm portion as an operation body. In this case, the user performs an input operation by moving the finger or the pen within an imaging range of the camera 20. Note that, in a case where the marker 3020 is attached to the arm portion of the user, and an operation body is a part of the arm portion of the user, the arm portion to which the marker 3020 is attached and the arm portion handled as the operation body may be the same as each other (both thereof are the left arm or the right arm), or may be different from each other (one is the left arm, and the other is the right arm). This is the same for a case where an operation body held by a part of the arm portion of the user.

For example, the recognition unit 2040 may handle a marker attached to an object or the user's body as an operation body. For example, the marker is attached to the user's body (for example, the finger). For example, the marker is attached to an object (for example, a pen) held by the user. For example, the marker is attached to an object attached to the user. The object attached to the user is, for example, the device 10 into which the sensor is built or a ring attached to the finger of the user.

Information indicating an object handled as an operation body by the recognition unit 2040 may be set in the recognition unit 2040 in advance, or may be stored in a storage device which can be accessed from the recognition unit 2040.

Note that a single object or a plurality of objects may be handled as an operation body by the recognition unit 2040.

<Method of Detecting Position of the Operation Body: S110>

The recognition unit 2040 detects a position of the operation body at a timing based on a result of detection by the sensor 3040 (S110). Hereinafter, the "timing based on a result of detection by the sensor 3040" will be referred to as a detection target timing.

The detection target timing is a timing at which vibration or the like is detected by the sensor 3040 or a timing close thereto. For example, in a case where a predetermined signal is transmitted to the information processing apparatus 2000 from the device 10 when vibration or the like is detected by the sensor 3040, the detection target timing is a time point at which the information processing apparatus 2000 receives the predetermined signal. In a case where information indicating a time point at which vibration or the like is detected by the sensor 3040 is transmitted from the device 10 to the information processing apparatus 2000, the detection target timing is the time point indicated by the information. For example, in a case where a predetermined change is applied to the appearance of the device 10 when vibration or the like is detected by the sensor 3040, the detection target timing is a time point at which the predetermined change is detected by the information processing apparatus 2000.

The recognition unit 2040 may set a time point corresponding to a predetermined time before or after the above-described various timings (for example, a time point at which the information processing apparatus 2000 receives a predetermined signal from the device 10) as the detection target timing.

Information indicating the time point handled as a detection target timing by the recognition unit 2040 or the predetermined time may be set in the recognition unit 2040 in advance, or may be stored in a storage device which can be accessed from the recognition unit 2040.

The recognition unit 2040 detects a position of the operation body from a captured image generated by the camera 20 at the detection target timing. Here, generally, since the camera 20 intermittently generates a captured image (for example, a frequency of 30 frames/sec (fps)), there is a case where there is no captured image generated at a time point matching the detection target timing. In this case, the recognition unit 2040 uses a captured image generated right before or right after the detection target timing.

The recognition unit 2040 detects an operation body from the inside of the operation region 40 of a captured image. Here, a known technique may be used as a technique of detecting a predetermined object captured in a predetermined region of an image.

There are various methods of the recognition unit 2040 defining a position of an operation body. For example, the recognition unit 2040 determines a region indicating an operation body in the operation region 40. The recognition unit 2040 handles a point included in the determined region as a position of the operation body. In this case, a position of the operation body may be any point included in the region indicating the operation body.

For example, in a case where the operation body is a part of the user's body or an object held by the user, the recognition unit 2040 calculates the center of the region indicating the operation body. The recognition unit 2040 handles a point, which is included in the region indicating the operation body and is farthest from the center of the region, as a position of the operation body. According to this method, for example, a fingertip or a pentip is a position of the operation body.

Figure 9:
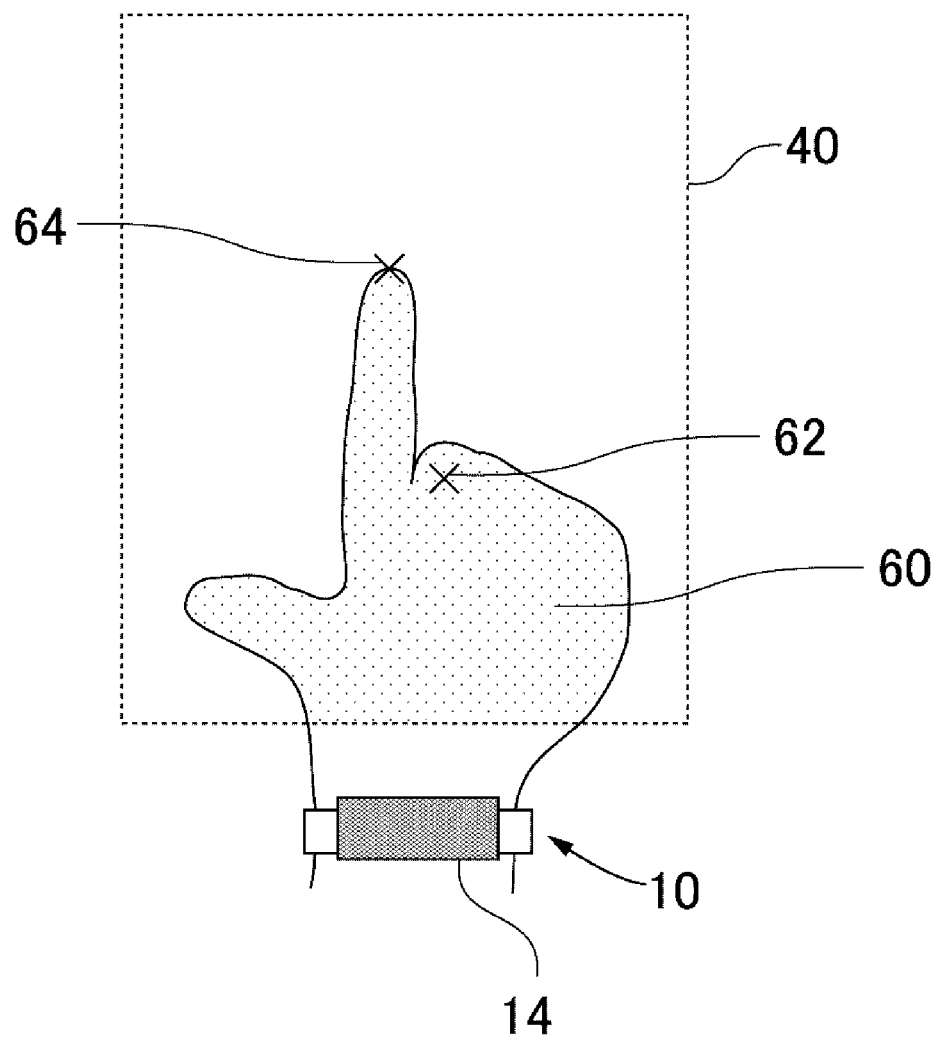
FIG. 9 is a first diagram illustrating a method of defining a position of an operation body.

FIG. 9 is a first diagram illustrating a method of defining a position of the operation body. In FIG. 9, the operation body is the user's hand. First, the recognition unit 2040 determines a region 60 indicating the user's hand in the operation region 40. Next, the recognition unit 2040 calculates the center 62 of the region 60. The recognition unit 2040 handles a point 64, which is included in the region 60 and is farthest from the center 62, as a position of the operation body. In a case where there are a plurality of points farthest from the center 62 in the region 60, for example, the recognition unit 2040 handles a point farthest from the marker 3020 among the plurality of points as a position of the operation body.

Here, for example, as in a case where an input operation is performed with a finger cushion, there is a case where a location slightly deviated from a fingertip is preferably handled as a position of the operation body. Therefore, the recognition unit 2040 may calculate the point 64 farthest from the center of the operation body, and may handle a position (for example, a position deviated by a predetermined distance in a direction of coming close to the marker 3020) slightly deviated from the point as a position of the operation body. Information indicating a positional relationship between the point 64 farthest from the center of the operation body and a position of the operation body may be set in the recognition unit 2040 in advance, or may be stored in a storage device which can be accessed from the recognition unit 2040.

In a case where the operation body is a marker attached to an object or the user's body, for example, the recognition unit 2040 determines a region indicating the marker from a captured image, and handles a central position or the like of the region as a position of the operation body.

The recognition unit 2040 is assumed to detect the operation body by using a reference image indicating an object to be detected as the operation body. In this case, a position of the operation body may be defined in advance in this reference image. The recognition unit 2040 determines a region similar to the reference image in the operation region 40. The recognition unit 2040 determines a point corresponding to the position of the operation body defined in the reference image in the region, and handles the point as a position of the operation body.

Figure 10:
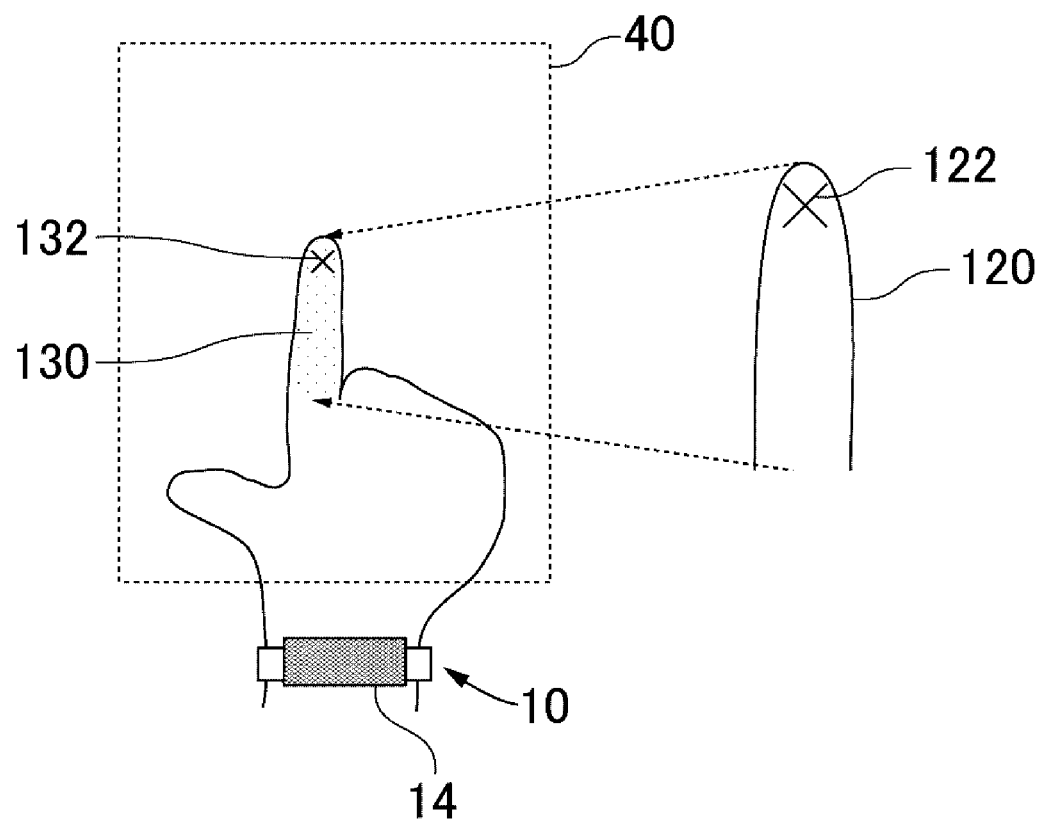
FIG. 10 is a second diagram illustrating a method of defining a position of the operation body.

FIG. 10 is a second diagram illustrating a method of defining a position of the operation body. In this example, the operation body is the user's finger. A reference image 120 is a reference image indicating a shape or the like of the user's finger. A position 122 of the operation body is a position of the operation body defined in the reference image in advance.

The recognition unit 2040 determines a region 130 similar to the reference image 120 in the operation region 40. The region 130 indicates the user's finger. The recognition unit 2040 determines a point 132 corresponding to the position 122 of the operation body when the reference image 120 is mapped onto the region 130. The recognition unit 2040 handles the point 132 as a position of the operation body.

Information regarding a method of the recognition unit 2040 defining a position of the operation body may be set in the recognition unit 2040 in advance, or may be stored in a storage device which can be accessed from the recognition unit 2040.

<Method of Detecting Motion of Operation Body: S110>

The recognition unit 2040 detects motion of the operation body at a period including the detection target timing (S110). Hereinafter, the "period including the detection target timing" will be referred to as a detection target period.

Figure 11A:
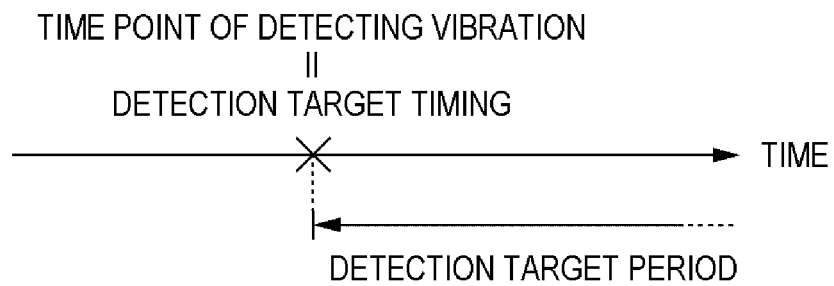
FIG. 11 are diagrams illustrating cases where a start point of a detection target period is set as a detection target timing.
Figure 11B:
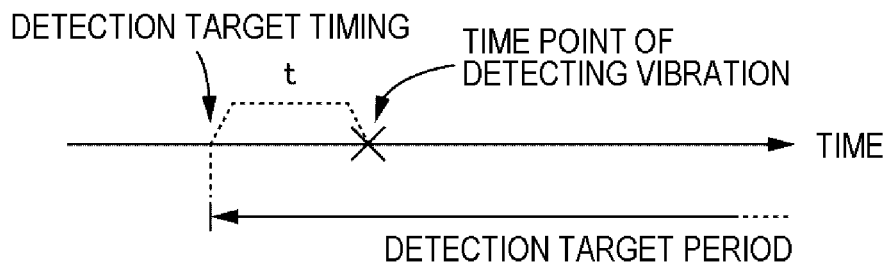
Figure 11C:
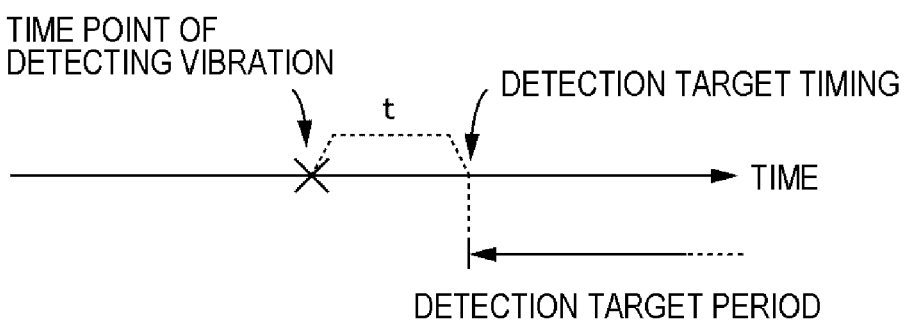

The recognition unit 2040 determines a start point and an end point of the detection target period by using the detection target timing. For example, the recognition unit 2040 handles the detection target timing as a start point of the detection target period. FIG. 11 are diagrams illustrating cases where a start point of the detection target period is handled as the detection target timing. In a case of FIG. 11A, the recognition unit 2040 handles a time point where vibration is detected by the sensor 3040 as the detection target timing. In a case of FIG. 11B, the recognition unit 2040 handles a time point corresponding to a predetermined time before a time point where vibration is detected by the sensor 3040 as the detection target timing. In a case of FIG. 11C, the recognition unit 2040 handles a time point corresponding to a predetermined time after a time point where vibration is detected by the sensor 3040 as the detection target timing.

Figure 12A:
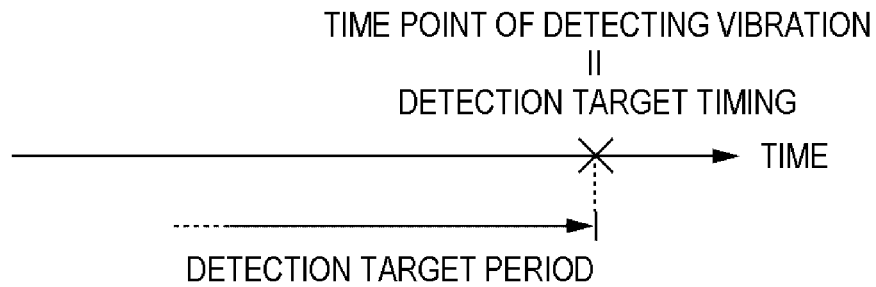
FIG. 12 are diagrams illustrating cases where an end point of a detection target period is set as a detection target timing.
Figure 12B:
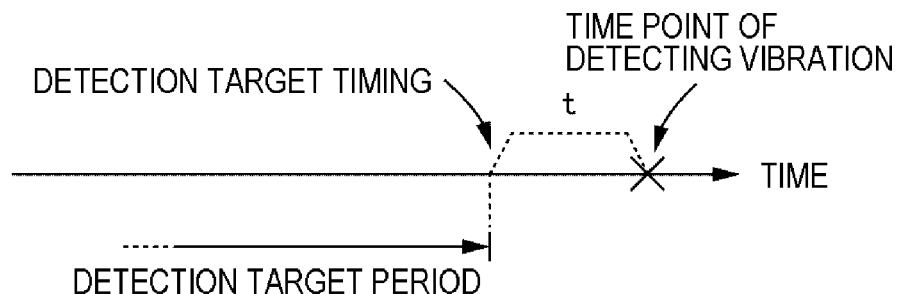
Figure 12C:
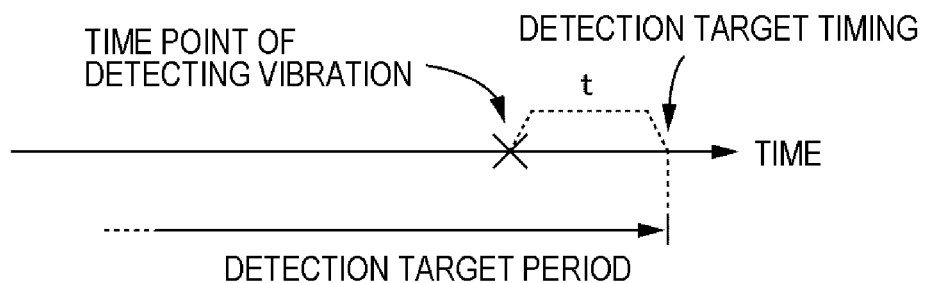

For example, the recognition unit 2040 handles the detection target timing as an end point of the detection target period. FIG. 12 are diagrams illustrating cases where an end point of the detection target period is handled as the detection target timing. In a case of FIG. 12A, the recognition unit 2040 handles a time point where vibration is detected by the sensor 3040 as the detection target timing. In a case of FIG. 12B, the recognition unit 2040 handles a time point corresponding to a predetermined time before a time point where vibration is detected by the sensor 3040 as the detection target timing. In a case of FIG. 11C, the recognition unit 2040 handles a time point corresponding to a predetermined time after a time point where vibration is detected by the sensor 3040 as the detection target timing.

The recognition unit 2040 defines the detection target period by using one or two detection target timings. In a case where the detection target period is defined by using a single detection target timing, the recognition unit 2040 defines a start point of the detection target period by according to any of the methods in FIG. 11, and handles a time point corresponding to a predetermined time after the time point as an end point of the detection target period. For example, the recognition unit 2040 defines an end point of the detection target period according to any of the methods in FIG. 12, and handles a time point corresponding to a predetermined time before the time point as an end point of the detection target period.

In a case where the detection target period is defined by using two detection target timings, the recognition unit 2040 defines a start point of the detection target period according to any of the methods in FIG. 11 and defines an end point of the detection target period according to any of the methods in FIG. 12.

In a case where a time point before a time point at which vibration is detected by the sensor 3040 is handled as a start point of the detection target period (FIG. 11A or FIG. 11B), or in a case where an end point of the detection target period is defined by using only a single detection target timing according to the detection target timing as in FIG. 12, the camera 20 is required to generate a captured image before the sensor 3040 detects vibration. In this case, the camera 20 starts imaging before the sensor 3040 detects vibration. For example, the camera 20 continuously performs imaging until the user finishes use of the information processing apparatus 2000 from starting thereof. A captured image generated by the camera 20 is continuously stored in a storage device or the like in a predetermined period.

On the other hand, in a case where a time point after a time point at which vibration is detected by the sensor 3040 is handled as a start point of the detection target period (FIG. 11C), the camera 20 may start imaging after the sensor 3040 detects vibration. In this case, for example, the camera 20 receives a signal indicating that vibration has been detected by the sensor 3040 from the device 10 or the information processing apparatus 2000, and starts imaging at a timing of receiving the signal.

Note that information indicating the predetermined time may be set the recognition unit 2040 in advance, or may be stored in a storage device which can be accessed from the recognition unit 2040. A predetermined time used to determine a start point of the detection target period may be the same as a predetermined time used to determine an end point of the detection target period, or may be different therefrom.

The recognition unit 2040 detects motion of the operation body by using a captured image generated in the detection target period. In a case where there are a plurality of captured images generated in the detection target period, for example, the recognition unit 2040 performs image analysis on each operation region 40 of the plurality of captured images so as to calculate a position of the operation body in each operation region 40. The recognition unit 2040 uses information indicating a change in a position of the operation body as information indicating motion of the operation body. The information indicating a change in a position of the operation body is, for example, information in which positions of the operation body are arranged in a time series.

A single captured image may be generated in the detection target period. A moving operation body is frequently included in a single captured image in a state of blurring. Therefore, the recognition unit 2040 calculates motion of the operation body from an image of the blurring operation body included in the single captured image.

Figure 13:
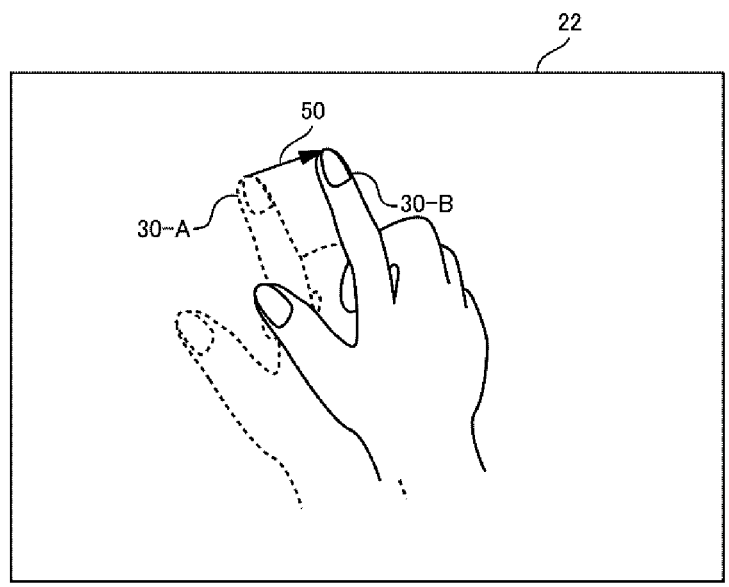
FIG. 13 is a diagram illustrating a captured image including the blurring finger of a user.

FIG. 13 is a diagram illustrating the captured image 22 including the blurring finger of the user. In the captured image 22, the finger 30 of the user blurs so that it moves from the finger 30-A to the finger 30-B. The recognition unit 2040 detects changes in position of a feature point common to the finger 30-A and the finger 30-B as motion of the operation body. For example, the recognition unit 2040 detects motion 50 defined by the change in position a fingertip of the finger 30-A and a fingertip of the finger 30-B.

<Input Operation Recognized by Recognition Unit 2040: S112>

The recognition unit 2040 recognizes an input operation on the basis of the detected position or motion of the operation body (S112). The recognition unit 2040 may recognize various input operations defined on the basis of a position or motion of the operation body. Hereinafter, a description will be made of various input operations which can be recognized by the recognition unit 2040.

<<Input Operation Defined on the Basis of Position of Operation Body>>

For example, the recognition unit 2040 receives an input operation (hereinafter, a selection operation) of selecting one option from among a plurality of options on the basis of a position of the operation body. For example, the selection operation includes an operation of selecting YES or NO, an operation of selecting UP or DOWN, or the like. The operation of selecting UP or DOWN includes, for example, an operation of adjusting a temperature or a wind direction of an air conditioner.

For example, the recognition unit 2040 recognizes an operation of selecting a first option in a case where the operation body is located in an upper half portion of the operation region 40, and recognizes an operation of selecting a second option in a case where the operation body is located in a lower half portion of the operation region 40.

FIG. 14 are diagrams illustrating operations defined on the basis of a position of the operation body. In FIG. 14, the operation region 40 has a rectangular shape having a position separated from the marker image captured in the touch panel 14 in the back of the hand by a predetermined distance as the center. If the finger 30 is unfolded as illustrated in FIG. 14A, the finger 30 is included in an upper half portion of the operation region 40. On the other hand, as illustrated in FIG. 14B, if the finger 30 is folded, the finger 30 is included in a lower half portion of the operation region 40.

For example, the operations illustrated in FIG. 14 may be used to change temperature settings of an air conditioner. In a case where it is desired to increase the temperature of the air conditioner, the user taps any location with the finger 30 in a state of unfolding the finger 30 as illustrated in FIG. 14A. Then, the recognition unit 2040 detects that the finger 30 is located in the upper half portion of the operation region 40 at a timing at which vibration caused by the tapping is detected by the sensor 3040. The recognition unit 2040 recognizes an input operation "UP". A signal indicating the input operation "UP" is sent from the information processing apparatus 2000 to a control device of the air conditioner. The control device of the air conditioner increases a set temperature of the air conditioner by a predetermined value (for example, 1 degree) on the basis of the input operation "UP".

On the other hand, in a case where it is desired to decrease the temperature of the air conditioner, the user taps any location with the finger 30 in a state of folding the finger 30 as illustrated in FIG. 14B. Then, the recognition unit 2040 detects that the finger 30 is located in the lower half portion of the operation region 40 at a timing at which vibration caused by the tapping is detected by the sensor 3040. The recognition unit 2040 recognizes an input operation "DOWN". A signal indicating the input operation "DOWN" is sent from the information processing apparatus 2000 to the control device of the air conditioner, and the control device of the air conditioner having received the signal decreases a set temperature of the air conditioner by a predetermined value (for example, 1 degree).

As mentioned above, according to the method of recognizing an input operation depending on a relative position (for example, depending on in which portion of the upper half portion and the lower half portion of the operation region 40 the finger is located) of the operation body in the operation region 40, the user can perform an input operation at any location unlike a case where an input operation is performed by using a physical button, a keyboard, or the like. Therefore, the user can perform an input operation in a free location and is not required to view an input device, and can thus easily perform an input operation.

Note that, as illustrated in FIG. 14, a method of dividing the operation region 40 is not limited to a method of dividing the operation region into upper and lower half portions. For example, the recognition unit 2040 may divide the operation region 40 into two portions such as left and right portions, or may divide the operation region 40 into four portions such as upper, lower, right and left portions.

<<Input Operation Defined on the Basis of Motion of Operation Body>>

The recognition unit 2040 1) may recognize a shape based on detected motion of the operation body as an input operation, and 2) may recognize a predetermined input operation corresponding to detected motion of the operation body. Hereinafter, each thereof will be described.

<<Case of Recognizing Input Operation of Inputting Shape Based on Motion of Operation Body>>

Figure 15A:
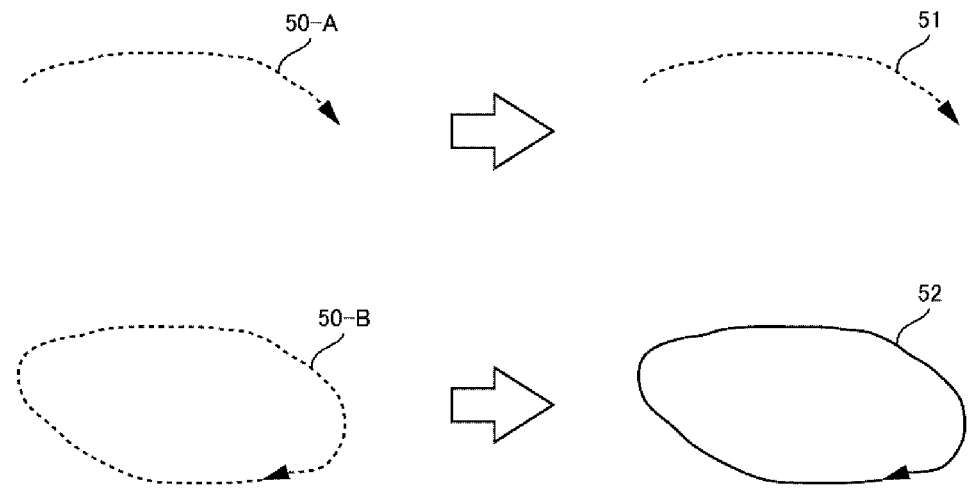
FIG. 15 are diagrams illustrating scenes in which an input operation of inputting a shape defined by motion of an operation body is recognized.

FIG. 15 are diagrams illustrating cases of recognizing an input operation of inputting a shape defined by motion of the operation body. In FIG. 15A, the recognition unit 2040 recognizes an input operation of inputting a shape 51 indicated by motion 50-A of the operation body or a shape 52 indicated by motion 50-B. For example, this input operation is used to perform handwriting.

Figure 15B:
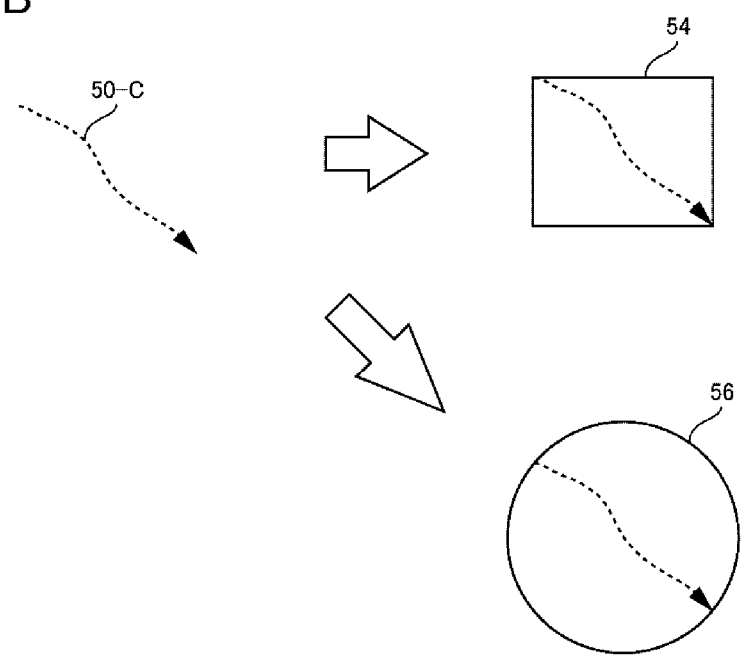

In FIG. 15B, the recognition unit 2040 recognizes an input operation of inputting a shape which is different from motion of the operation body, but a shape the shape and the size of which are defined by motion of the operation body. Specifically, the recognition unit 2040 recognizes an input operation of inputting a rectangular shape 44 having both ends of motion 50-C as both ends of a diagonal line or a circular shape 56 having both ends of motion 50-C as both ends of a diameter. For example, this input operation is used for the user to perform input (a selection operation or the like) indicating a certain range or to draw a predetermined graphic.

Information indicating which one of the method illustrated in FIG. 15A and the method illustrated in FIG. 15B is used may be fixed in advance, or may be set by the user. The Information indicating which one is used may be set in the recognition unit 2040 in advance, or may be stored in a storage device which can be accessed from the recognition unit 2040.

<<Case where Predetermined Input Operation Corresponding to Motion of Operation Body is Recognized>>

Figure 16A:
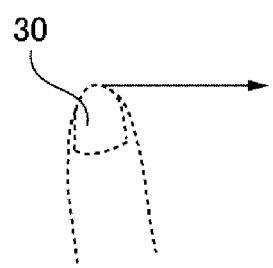
FIG. 16 are diagrams illustrating gesture inputs.
Figure 16B:
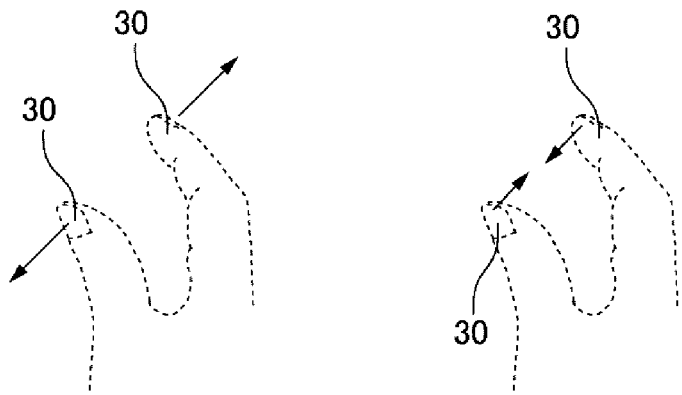

A predetermined input operation corresponding to detected motion of the operation body is an input operation based on so-called gesture input. FIG. 16 are diagrams illustrating gesture inputs. FIG. 16A illustrates a flick action, and FIG. 16B illustrates a pinch-in/pinch-out action. Note that the arrows indicate motion of the operation body.

Information in which motion of the operation body is correlated with a predetermined input operation corresponding to the motion may be set in the recognition unit 2040 in advance, or may be stored in advance in a storage device which can be accessed from the recognition unit 2040.

<<Handling of Location where Action of Moving Operation Body is Performed>>

The recognition unit 2040 1) may recognize only motion of the operation body as input regardless of a position where an action of moving the operation body is performed, or 2) may recognize a combination of motion of the operation body and a position where an action of moving the operation body is performed as input. In the former case, even if an action of moving the operation body is performed at any location on the captured image 22, the same motion of the operation body indicates the same input. On the other hand, in the latter case, a location where an action of moving the operation body is performed on the captured image 22 has a meaning. For example, in a case where the user performs input of surrounding a specific object included in a captured image with a circle, not only a shape such as the circle but also what is surrounded by the circle has a meaning.

In a case of 1), as described above, the recognition unit 2040 recognizes a shape defined by motion of the operation body detected by the recognition unit 2040 or a gesture defined by motion of the operation body as input. On the other hand, in a case of 2), the recognition unit 2040 recognizes, as input, transition in a coordinate of the operation body on the captured image 22, detected by the recognition unit 2040.

A method of 1) and 2) in which the recognition unit 2040 recognizes input may be set in the recognition unit 2040 in advance, or may be stored in a storage device which can be accessed from the recognition unit 2040, and may be selected by the user.

<Method of Indicating Position or Motion of Operation Body>

A position or motion of the operation body recognized by the recognition unit 2040 may be a relative position or motion in the operation region 40, or a relative position or motion in the entire captured image.

FIG. 17 are diagrams illustrating scenes in which a position or motion of the operation body is indicated by a relative position or motion in the operation region 40. In FIG. 17, the operation region 40 is indicated by a rectangular shape.

Figure 17A:
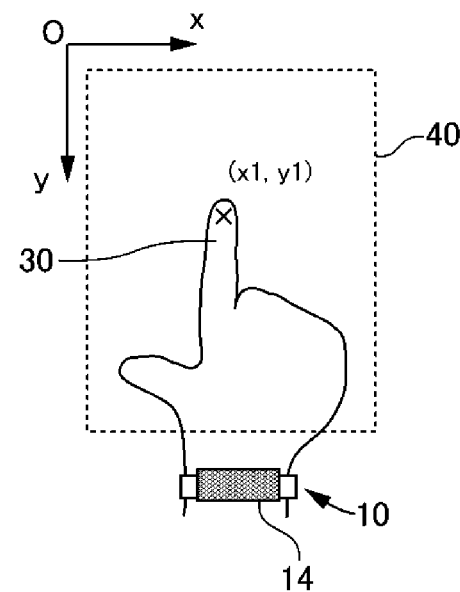
FIG. 17 are diagrams illustrating scenes in which a position or motion of an operation body is indicated by a relative position or motion in an operation region.

FIG. 17A illustrates a case where a position of the operation body is recognized as an input operation. In FIG. 17A, a coordinate (x1,y1) which is a position of the operation body is a coordinate in a coordinate system having an upper left end of the operation region 40 as the origin, a rightward direction in a plan view of the operation region 40 as an x direction, and a downward direction in a plan view of the operation region 40 as a y direction.

Figure 17B:
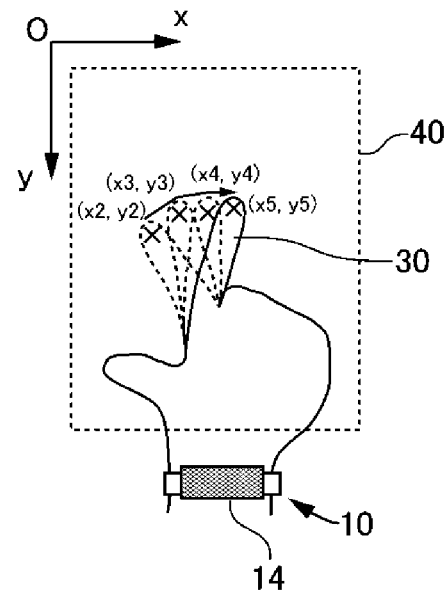

FIG. 17B illustrates a case where motion of the operation body is recognized as an input operation. In FIG. 17B, a position of the operation body changes in the order of (x2,y2), (x3,y3), and (x4,y4). Each of these coordinates is a coordinate in the coordinate system described in FIG. 17A. Motion of the operation body is indicated by information in which, for example, the coordinates are arranged in a time series. Note that an arrow indicates a trajectory of the operation body. However, in order for the drawing to be easily viewed, the arrow is drawn at a position deviated from an actual locus of the operation body.

Figure 18A:
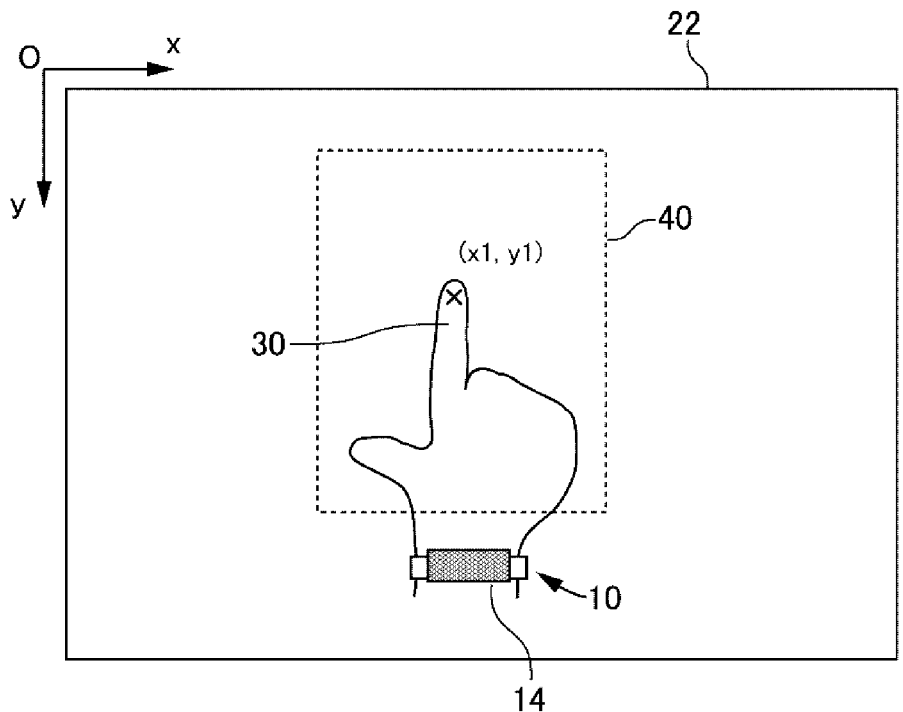
FIG. 18 are diagrams illustrating scenes in which a position or motion of an operation body is indicated by a relative position or motion in the entire captured image.

On the other hand, FIG. 18 are diagrams illustrating scenes in which a position or motion of the operation body is indicated by a relative position or motion in the entire captured image. FIG. 18A illustrates a case where a position of the operation body is recognized as an input operation. In FIG. 18A, a coordinate (x1,x1) which is a position of the operation body is a coordinate in a coordinate system having an upper left end of the captured image 22 as the origin, a rightward direction in a plan view of the captured image 22 as an x direction, and a downward direction in a plan view of the captured image 22 as a y direction.

Figure 18B:
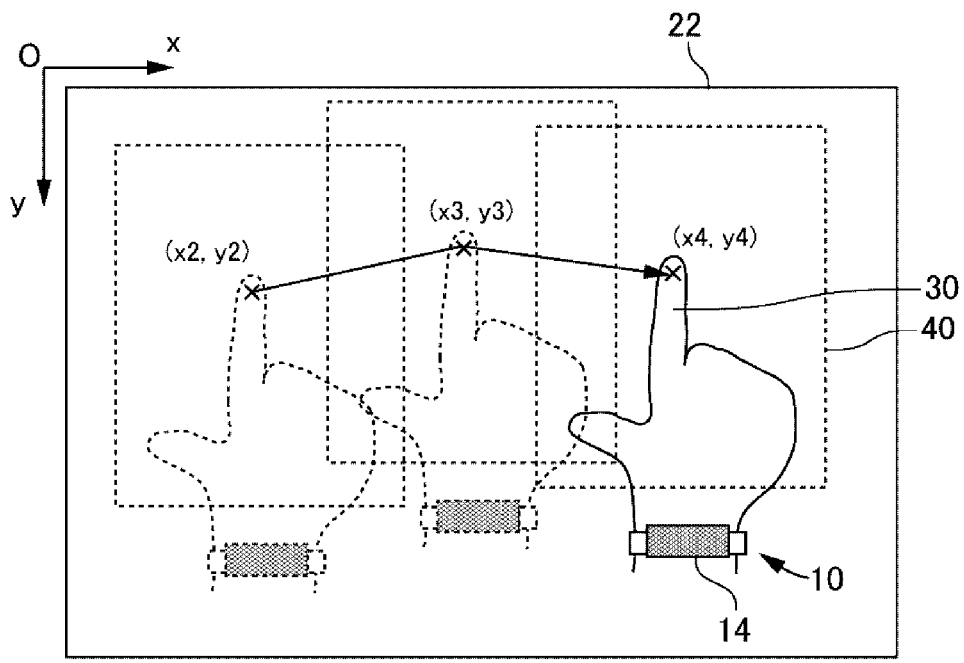

FIG. 18B illustrates a case where motion of the operation body is recognized as an input operation. In FIG. 18B, a position of the operation body changes in the order of (x2,y2), (x3,y3), and (x4,y4). Each of these coordinates is a coordinate in the coordinate system described in FIG. 18A. Motion of the operation body is indicated by information in which, for example, the coordinates are arranged in a time series. Note that an arrow indicates a trajectory of the operation body in the same manner as in FIG. 17B.

As illustrated in FIG. 17, the method in which a position or motion of the operation body is recognized by using a relative position or motion in the operation region 40 is suitable for a case where the user performs an input operation with a relatively small action. For example, it is assumed that the device 10 is attached to the user's wrist, and a marker image is displayed on the touch panel 14. The operation body is assumed to be the user's finger. In this case, for example, the user places the wrist to which the device 10 is attached at a proper location (for example, on a desk). Consequently, a position of the marker 3020 is substantially fixed. The user moves the finger with the wrist as a fulcrum so as to perform an input operation (refer to FIG. 17B). However, a position of the marker 3020 is not necessarily fixed.

On the other hand, as illustrated in FIG. 18, the method in which a position or motion of the operation body is recognized by using a relative position or motion in the entire captured image is suitable for a case where the user performs an input operation with a relatively great action. For example, it is assumed that the device 10 is attached to the user's wrist, and a marker image is displayed on the touch panel 14. The operation body is assumed to be the user's finger. In this case, for example, the user moves the hand or the arm on the whole so as to perform an input operation (refer to FIG. 18B).

Information indicating whether a position or motion of the operation body is indicated by a relative position or motion in the operation region 40 or by a relative position or motion in the entire captured image may be set in the recognition unit 2040 in advance, or may be stored in a storage device which can be accessed from the recognition unit 2040. A method of indicating a position or motion of the operation body may be any method of being capable of indicating a position or motion of the operation body, and is not limited to the above-described two methods.

Example Embodiment 2

Figure 19:
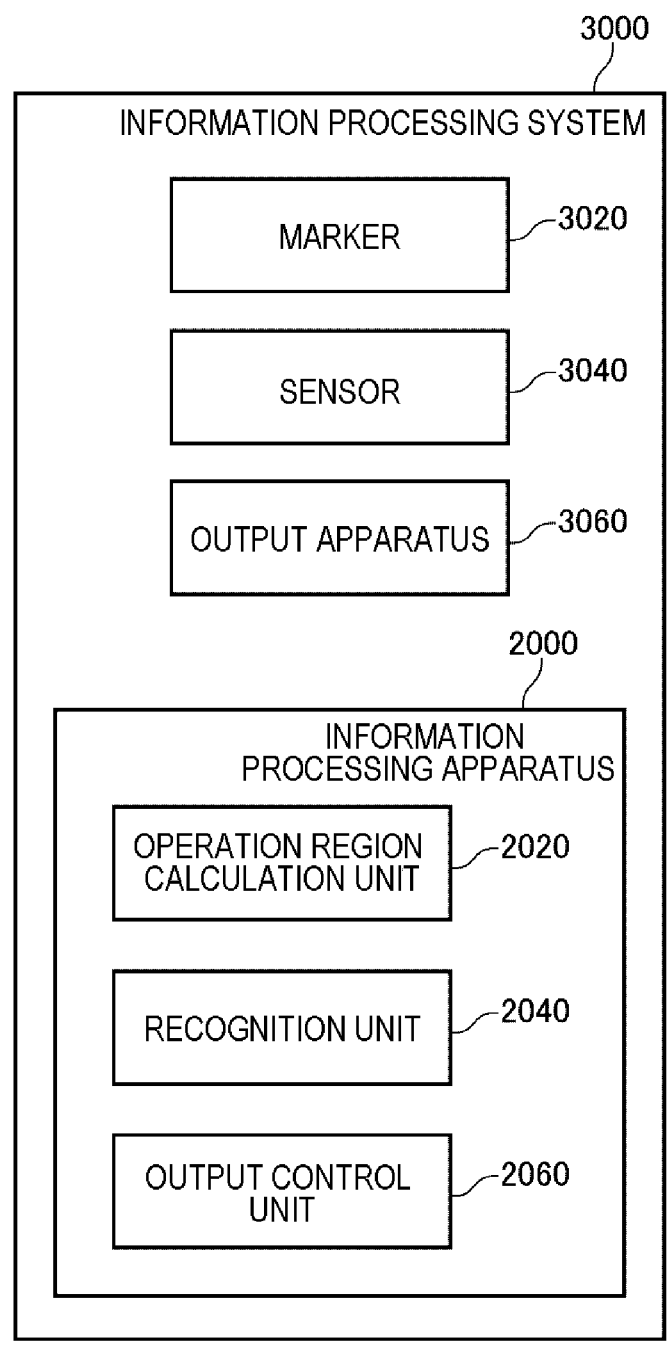
FIG. 19 is a block diagram illustrating an information processing system according to Example Embodiment 2.

FIG. 19 is a block diagram illustrating an information processing system 3000 according to Example Embodiment 2. The information processing system 3000 of Example Embodiment 2 has the same function as that of the information processing system 3000 of Example Embodiment 1 except for the following description.

The information processing system 3000 of Example Embodiment 2 includes an output apparatus 3060. The output apparatus 3060 is any apparatus outputting a screen. For example, the output apparatus 3060 is an apparatus such as a projector projecting a screen. For example, the output apparatus 3060 is a display device displaying a screen.

The information processing apparatus 2000 of Example Embodiment 2 includes an output control unit 2060. The output control unit 2060 controls the output apparatus 3060 to output a screen. The screen output from the output apparatus 3060 by the output control unit 2060 includes an operation target of an input operation recognized by the recognition unit 2040.

FIG. 20 are diagram illustrating screens output from the output apparatus 3060 by the output control unit 2060. In FIG. 20, an operation screen 70 includes a button 72, a button 74, a cursor 76, an icon 78, and a set temperature 79. The icon 78 is a picture used for the user to recognize an operation target. The user understands that an operation target is air conditioner temperature setting by viewing the icon 78. The button 72 is a button for increasing a set temperature of the air conditioner. The button 74 is a button for reducing a set temperature of the air conditioner. The cursor 76 is a cursor indicating a target operated by the user's input operation. The set temperature 79 indicates the current set temperature.

Figure 20A:
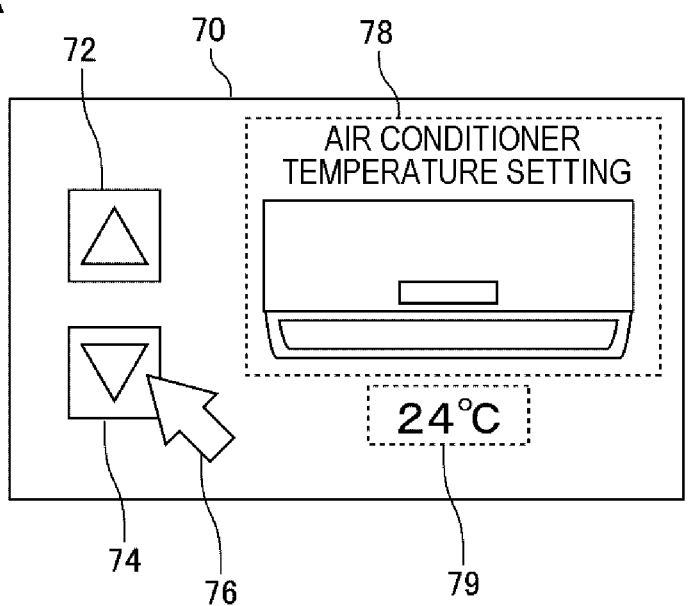
FIG. 20 are diagrams illustrating screens which are output from an output apparatus by an output control unit.

FIG. 20A illustrates the operation screen 70 before the user performs an input operation. For example, in a case where the recognition unit 2040 recognizes an input operation of pressing the button 72, a signal indicating input "UP" is transmitted to a control device of the air conditioner. As a result, the control device of the air conditioner performs control of increasing the set temperature of the air conditioner. On the other hand, in a case where the recognition unit 2040 recognizes an input operation of pressing the button 74, a signal indicating input "DOWN" is transmitted to a control device of the air conditioner. As a result, the control device of the air conditioner performs control of reducing the set temperature of the air conditioner.

Figure 20B:
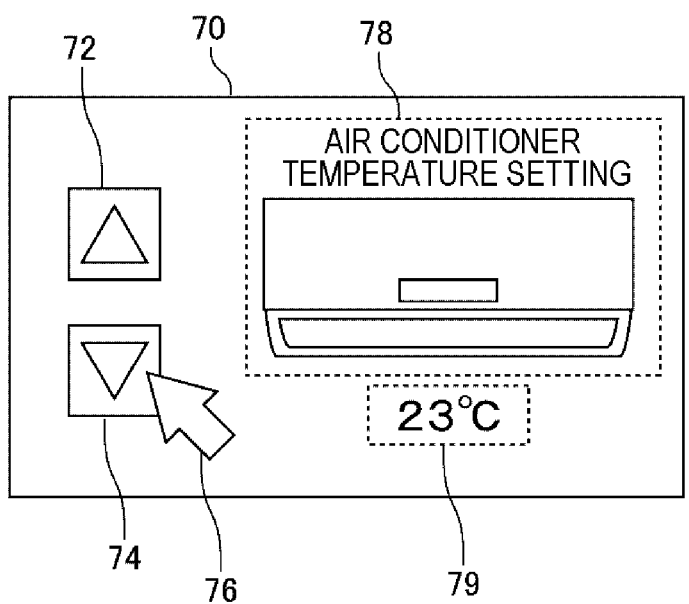

FIG. 20B illustrates the operation screen 70 after the user performs an input operation. Specifically, the operation screen 70 after the user performs an input operation of pressing the button 74 is illustrated. As a result of the input operation, the set temperature of the air conditioner displayed on the operation screen 70 is changed from 24° C. to 23° C.

Here, there are various input operations performed in order for the user to move the cursor 76. For example, the user performs an input operation (for example, an action of moving the finger 30 after performing tapping with the finger 30) of moving the operation body in order to move the cursor 76. The recognition unit 2040 recognizes motion of the operation body as an input operation. The output control unit 2060 changes a display position of the cursor 76 on the basis of motion indicated by the input operation.

For example, the recognition unit 2040 may recognize a position of the operation body as an input operation, and the output control unit 2060 may display the cursor 76 at a position in the operation screen 70 corresponding to the position of the operation body recognized by the recognition unit 2040.

Similarly, there are various input operations performed in order for the user to press the button 72 or the button 74. For example, the user performs an input operation (for example, tapping with the finger 30) of inputting a position in a state in which the cursor 76 overlaps the button 72. The recognition unit 2040 recognizes the input operation of pressing the button 72 on the basis of the position of the operation body and information regarding the operation screen 70 displayed by the output control unit 2060. For example, the user may perform an input operation of surrounding the button 72 by moving the cursor 76. The recognition unit 2040 recognizes the input operation of surrounding the button 72 on the basis of the motion of the operation body and information regarding the operation screen 70 displayed by the output control unit 2060, so as to recognize the input operation as an input operation of pressing the button 72.

Note that there are various methods of correlating a position or motion of the operation body recognized from a captured image with a position or motion in the operation screen 70. For example, in a case where a position or motion of the operation body is indicated by a relative position or motion in the operation region 40 (refer to FIG. 17), the recognition unit 2040 converts a coordinate indicating a position or motion of the operation body in the operation region 40 into a coordinate in the operation screen 70. Consequently, the position or motion of the operation body in the operation region 40 is converted into a position or motion in the operation screen 70.

For example, in a case where a position or motion of the operation body is indicated by a relative position or motion in the captured image 22 (refer to FIG. 18), the recognition unit 2040 converts a coordinate indicating a position or motion of the operation body in the captured image 22 into a coordinate in the operation screen 70. Consequently, the position or motion of the operation body in the captured image 22 is converted into a position or motion in the operation screen 70.

Note that a known technique may be used as a method of converting a coordinate in a certain coordinate system into a coordinate in another coordinate system.

<Flow of Process>

Figure 21:
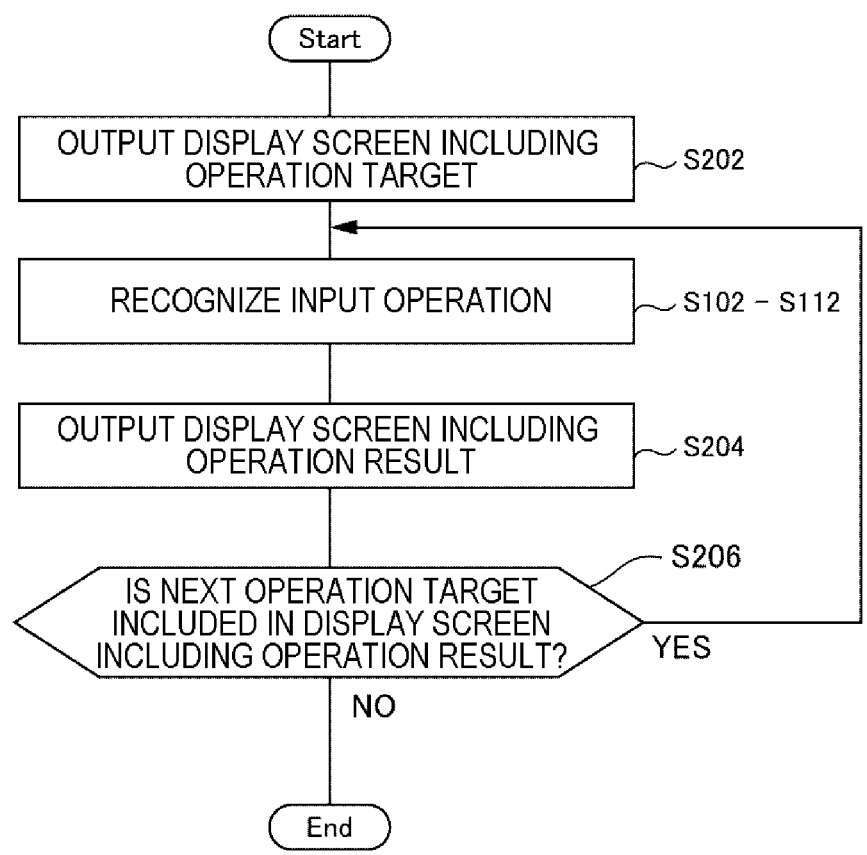
FIG. 21 is a flowchart illustrating a flow of processes performed by an information processing apparatus of Example Embodiment 2.

FIG. 21 is a flowchart illustrating a flow of processes performed by the information processing apparatus 2000 of Example Embodiment 2. First, the information processing apparatus 2000 receives an input operation which is a trigger to cause the output apparatus 3060 to output a display screen including the input operation target (S202). The input operation may be an input operation recognized by the recognition unit 2040, or may be other input operations. In the latter case, for example, the input operation is an operation on an input device (a switch, a keyboard, or the like) connected to the information processing apparatus 2000.

Next, the output control unit 2060 controls the output apparatus 3060 to output a display screen including an operation target (S204). The information processing apparatus 2000 recognize an input operation on the operation target by performing the processes in S102 to S112 illustrated in FIG. 4. The output control unit 2060 displays the display screen including an operation result on the output apparatus 3060.

In a case where the next input operation target is included in the display screen including the operation result (S206: YES), the process in FIG. 21 proceeds to S102. On the other hand, in a case where the next input operation target is not included in the display screen including the operation result (S206: NO), the process in FIG. 21 is finished.

<Hardware Configuration>

A hardware configuration of a computer implementing the information processing apparatus 2000 of Example Embodiment 2 is illustrated in FIG. 3, for example, in the same manner as in Example Embodiment 1. However, the storage 1080 of the computer 1000 implementing the information processing apparatus 2000 of the present example embodiment stores a program module for realizing each function of the information processing apparatus 2000 of the present example embodiment. The output apparatus 3060 is connected to the computer 1000 via the input/output interface 1100. However, a method of connecting the output apparatus 3060 to the computer 1000 is not limited to a connection method using the input/output interface 1100. For example, the output apparatus 3060 may be connected to the computer 1000 through a network. In this case, the computer 1000 includes a network interface for connection to the network.

Advantageous Effects

According to the present example embodiment, the output control unit 2060 outputs information regarding an operation target to the output apparatus 3060. Therefore, the user can perform an input operation while referring to the information regarding the operation target. In the above-described way, the convenience of the information processing system 3000 is improved for the user.

Note that a method of outputting information regarding an operation target may be methods other than a method of outputting a display screen. For example, the information processing system 3000 may output the information regarding the operation target in voices. Specifically, the name of a device which is currently an operation target, an operation method for the device, an operation result, or the like is output in voices.

EXAMPLES

Figure 22:
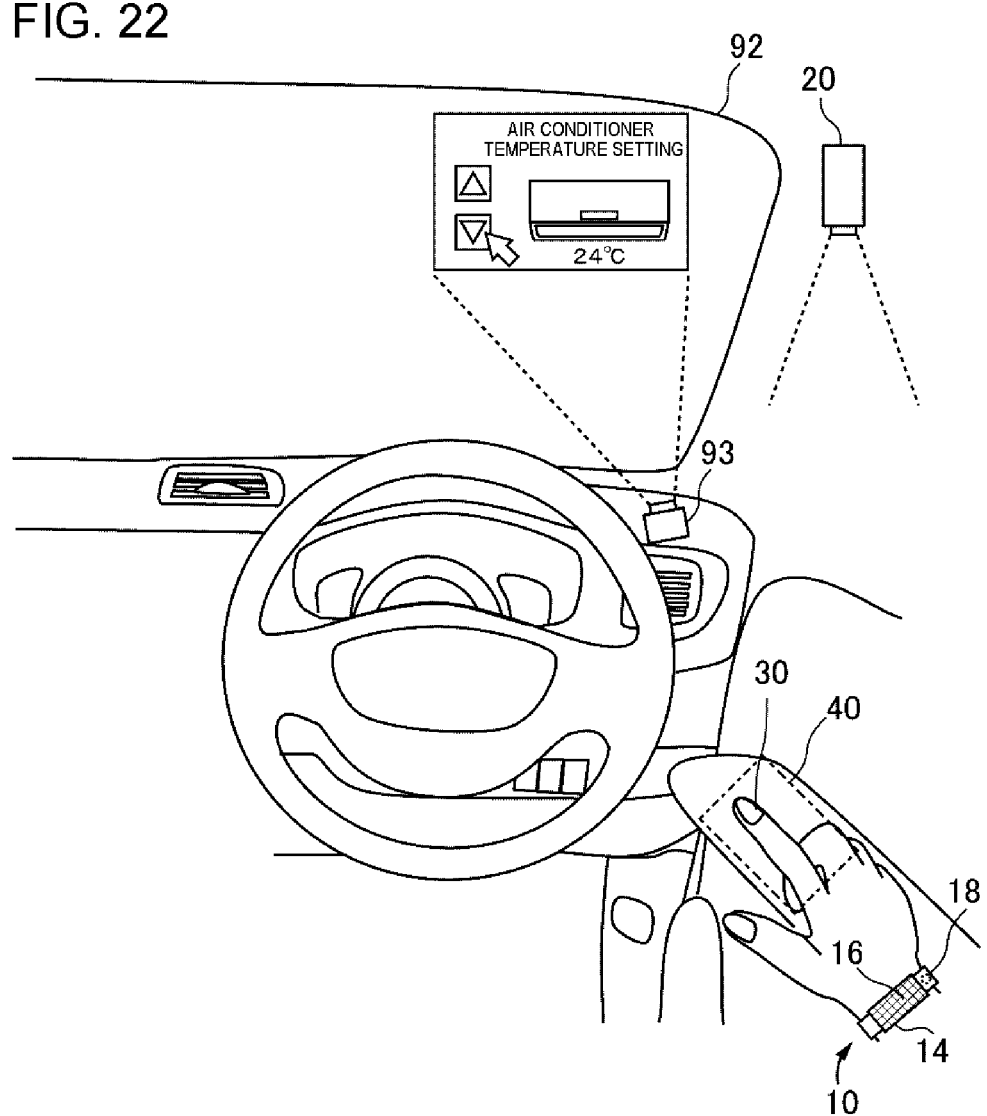
FIG. 22 is a diagram illustrating a use environment of an information processing system of an Example.

The information processing system 3000 of Example Embodiment 2 will be described more in detail through Examples. FIG. 22 is a diagram illustrating a use environment of the information processing system 3000 of the Example. In the present example, the information processing system 3000 is used by a person (for example, a driver) riding an automobile 90.

The device 10 is attached to the user's wrist. The device 10 displays the marker image 16 on the touch panel 14. The information processing apparatus 2000 handles the marker image 16 as the marker 3020. The marker image 16 is displayed on the touch panel 14 of the device 10. A vibration sensor 18 is built into the device 10. The information processing apparatus 2000 handles the vibration sensor 18 as the sensor 3040.

The camera 20 is provided to image a place (for example, an armrest or a steering wheel) on which the user's hand is placed. In the following description, it is assumed that the camera 20 is provided to image at least the periphery of the armrest.

The output apparatus 3060 is a projector 93 which projects a display screen onto a windshield 92. The projector 93 is provided at any position (for example, on a dashboard) where a display screen can be projected onto the windshield 92. Note that a location onto which a display screen is projected by the projector 93 is not limited to the windshield 92. For example, the projector 93 may project a display screen onto the steering wheel.

The recognition unit 2040 recognizes input operations for sending commands to various devices (a control device of an air conditioner or a car navigation system (hereinafter, a car navigation), or a mechanism controlling the gear change or lock/unlock of the automobile 90) provided on the automobile 90, the output control unit 2060, or the like. For example, an input operation is performed by the user.

First, the user performs an input operation for displaying a menu screen on the windshield 92. This operation is an operation of, for example, tapping any location in the operation region 40. In a case where the recognition unit 2040 recognizes this operation, the output control unit 2060 displays a menu screen.

Figure 23:
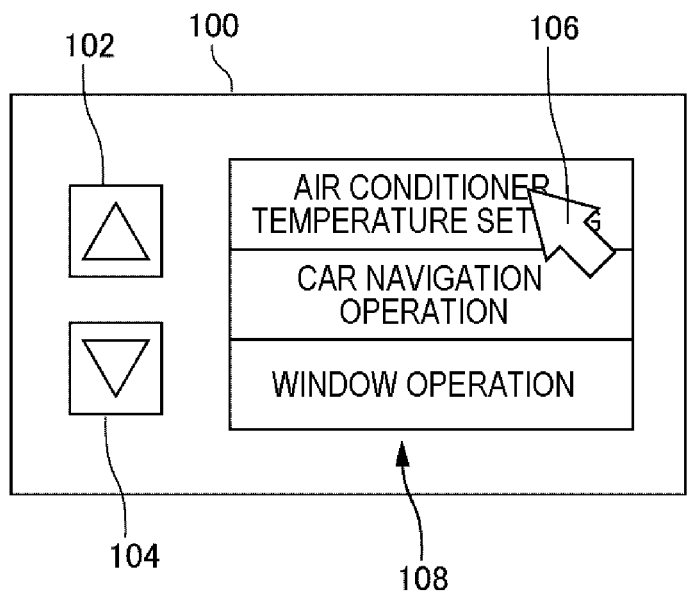
FIG. 23 is a diagram illustrating a menu screen.

FIG. 23 is a diagram illustrating a menu screen. A menu screen 100 includes a button 102, a button 104, a cursor 106, and a menu 108. The button 102 and the button 104 are buttons for changing an item displayed in the menu 108. The cursor 106 is a cursor indicating a selection target item. The menu 108 is a menu listing selection target items.

Here, it is assumed that the user sets a temperature of the air conditioner. In this case, the user moves the finger in the operation region 40 such that the cursor 106 indicates an item such as an "air conditioner operation". For example, the user places the wrist on the armrest so as to fix a position of the marker image 16. Consequently, a position of the operation region 40 is fixed. The user moves the finger in this state. In this case, the operation region 40 has a rectangular shape having a position separated from the marker image in the direction of the back of the hand by a predetermined distance as the center.

If the user selects the item such as the air conditioner operation, for example, the operation screen 70 illustrated in FIG. 20 is displayed. The user sets the temperature of the air conditioner according to the method described with reference to FIG. 20.

Figure 24:
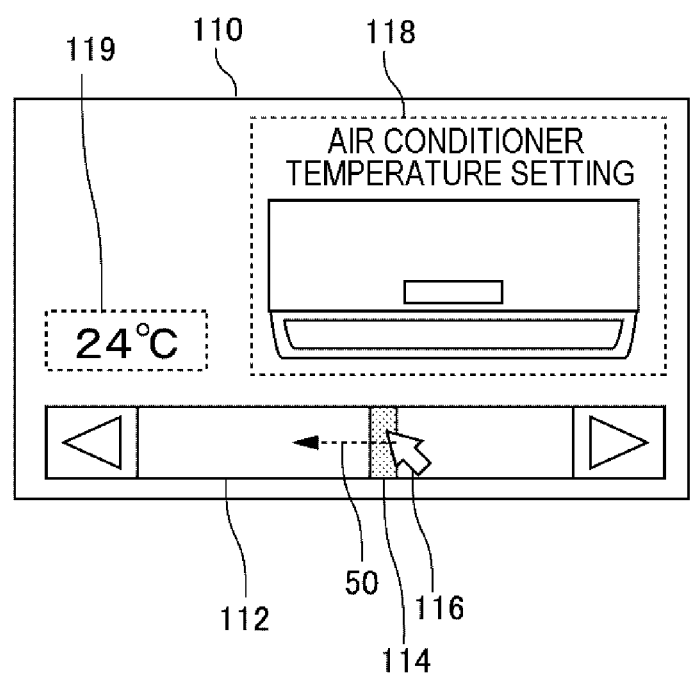
FIG. 24 is a diagram illustrating another example of an air conditioner operation screen.

For example, the air conditioner operation may be performed by using an operation screen 110 illustrated in FIG. 24. FIG. 24 is a diagram illustrating another example of an operation screen for the air conditioner. The operation screen 110 includes a scroll bar 112, a knob 114, a cursor 116, an icon 118, and a set temperature 119. The cursor 116, the icon 118, and the set temperature 119 are respectively the same as the cursor 76, the icon 78, and the set temperature 79 in FIG. 20.

The scroll bar 112 is an interface for changing the set temperature of the air conditioner. The user moves the knob 114 to the left so as to decrease the set temperature of the air conditioner, and moves the knob 114 to the right so as to increase the set temperature of the air conditioner.

First, the user moves the cursor 116 to a position of overlapping the knob 114. The user performs motion 50 of moving the knob 114 to the left, for example, so as to decrease the set temperature of the air conditioner. For example, the motion 50 is motion in which the armrest is tapped with the finger 30 in a state in which the cursor 116 overlaps the knob 114, the knob 114 is moved to the left by sliding the finger 30 to the left, and then the sliding operation is finished by tapping the armrest with the finger 30 again. In this case, the recognition unit 2040 handles a detection timing based on vibration caused by the former tapping as a start point of the detection target period, and a detection target timing based on vibration caused by the latter tapping as an end point of the detection target period. The recognition unit 2040 recognizes the motion 50 (sliding operation) performed in the detection target period as an input operation. However, as described above, a method of defining the detection target period is not limited to method using two detection target timings.

Figure 25A:
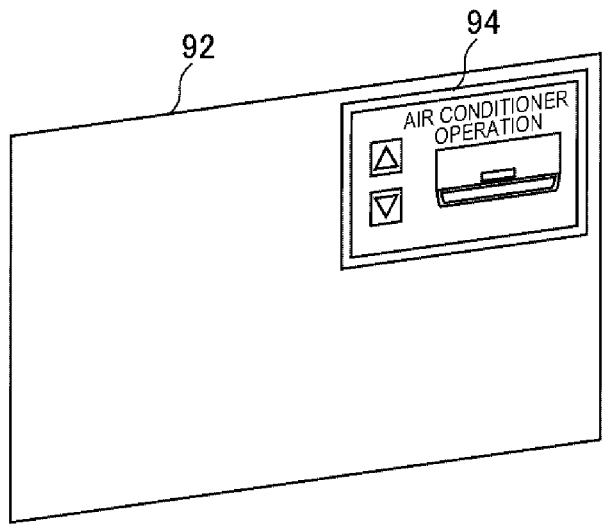
FIG. 25 are diagram illustrating scenes in which an operation screen is displayed on a display device.
Figure 25B:
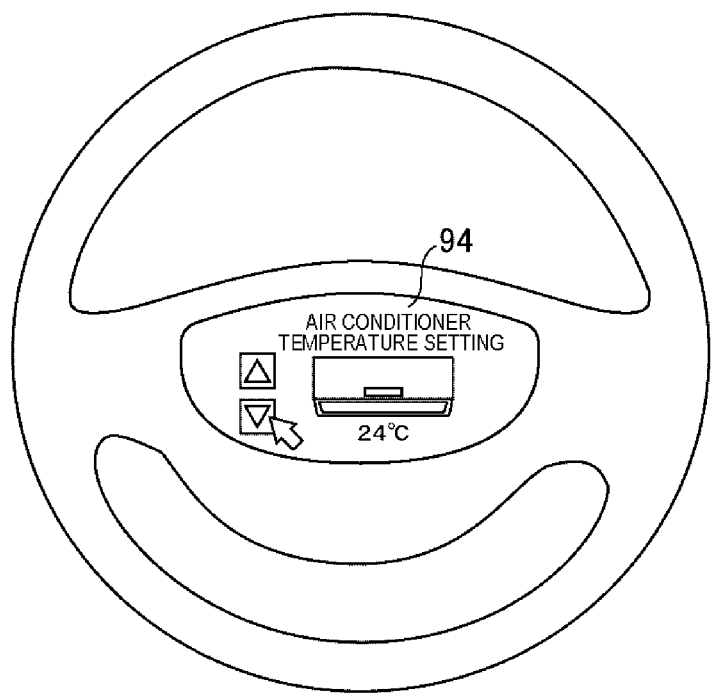

A method of displaying an operation screen on the windshield 92 of the automobile 90 is not limited to a method of projecting the operation screen with a projector. For example, an operation screen may be displayed on a display device provided inside a vehicle. FIG. 25 are diagrams illustrating scenes in which an operation screen is displayed on a display device. In FIG. 25A, a display device 94 is provided in a region overlapping the windshield 92 in a plan view. On the other hand, in FIG. 25B, the display device 94 is provided at a central portion of the steering wheel. Note that, in FIG. 25A, the display device 94 may be provided to be in contact with the windshield 92, or may be provided not to be in contact with the windshield 92.

In a case where a display screen is displayed on the display device 94, there is an advantage that brightness or the like of the display screen is set to brightness or the like easily viewed by the user compared with a projection method using a projector or the like. As illustrated in FIG. 25A, in a case where the display device 94 is provided in the region overlapping the windshield 92 in a plan view, a driver of the automobile 90 can view an operation screen while viewing an travelling direction of the automobile 90 when the driver performs an input operation. Therefore, an input operation during driving is facilitated.

Note that a location where the display device 94 is provided is not limited to the location illustrated in FIG. 25. The display device 94 may be a display device of a car navigation.

As mentioned above, the example embodiments of the present invention have been described with reference to the drawings, but these are only examples of the present invention, and combinations of the example embodiments and various configurations other than the example embodiments may be employed.

For example, the recognition unit 2040 may detect a position or motion of the operation body from the entire captured image instead of the inside of the operation region 40. In this case, the information processing apparatus 2000 may not include the operation region calculation unit 2020. In this case, the user may not wear the marker 3020.

For example, the sensor 3040 may not be attached to the user. In this case, the sensor 3040 is provided near a location where the user uses the information processing system 3000. For example, in the above-described Example, the sensor 3040 may be provided at any location of the automobile 90. For example, the sensor 3040 is provided in the steering wheel of the automobile 90.

The user causes the sensor 3040 to perform detection at a timing at which an input operation is performed or before or after this timing. For example, in a case where the sensor 3040 is a vibration sensor, the user applies vibration to a location where the sensor 3040 is provided or the vicinity thereof. For example, in a case where the sensor 3040 is provided in the steering wheel of the automobile 90, the user performs an action of tapping the steering wheel with the hand when performing an input operation.

Figure 26:
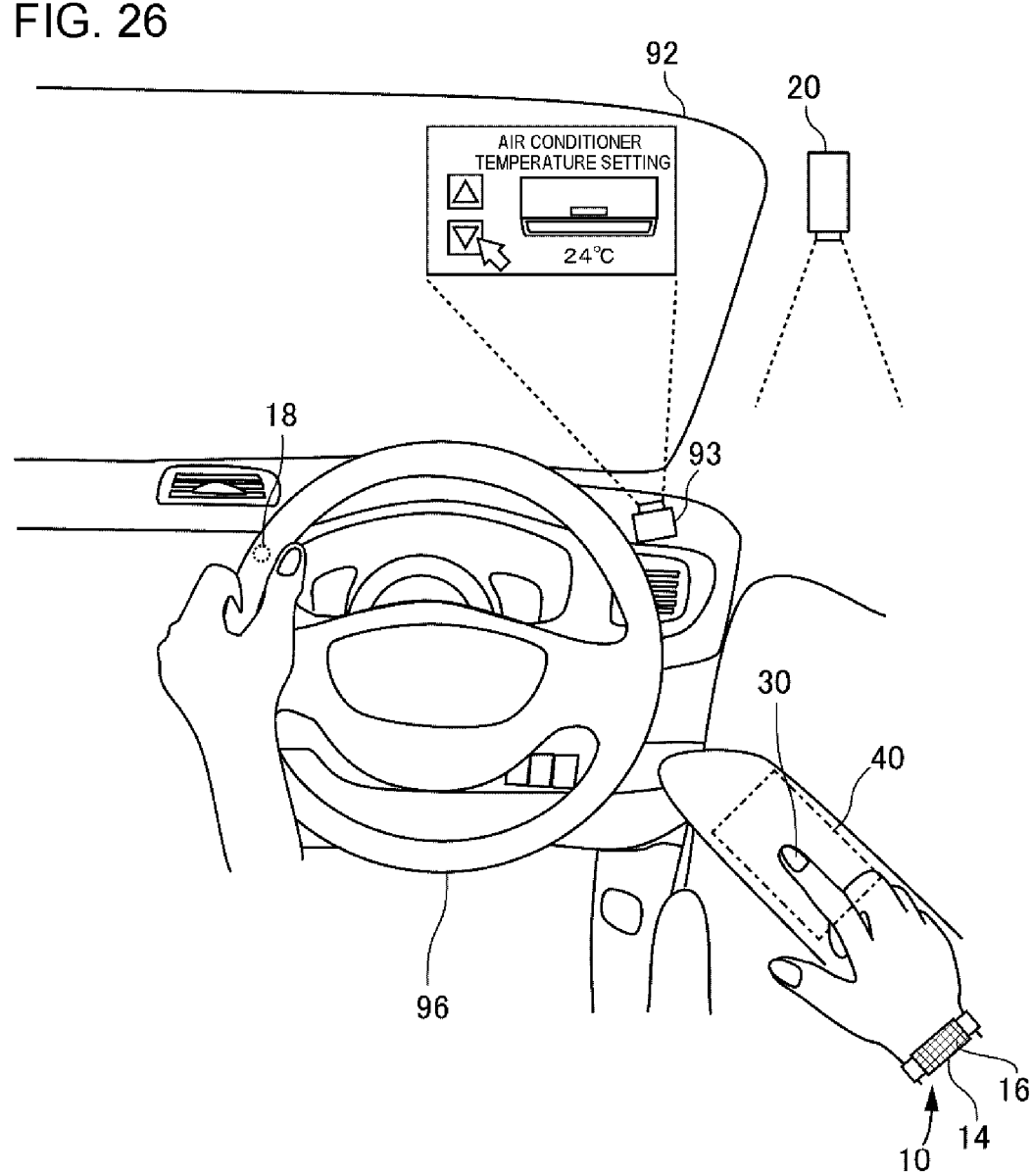
FIG. 26 is a diagram illustrating a scene in which a sensor is provided on a steering wheel of an automobile.

FIG. 26 is a diagram illustrating a scene in which the sensor 3040 is provided in the steering wheel of the automobile 90. In FIG. 26, the vibration sensor 18 is provided inside a steering wheel 96. The user taps the steering wheel 96 with the finger 32 when performing an input operation. Note that, at this time, the user may perform an input operation with the left hand, or may perform an input operation with the right hand. In a case where the user performs an input operation with the left hand, the camera 20 is provided at a position where the vicinity of the left hand is imaged. In this case, the device 10 is provided on the wrist of the user's left hand. However, as described above, in a case where the recognition unit 2040 detects a position or motion of the operation body from the entire captured image, the user may not wear the device 10.

Figure 27:
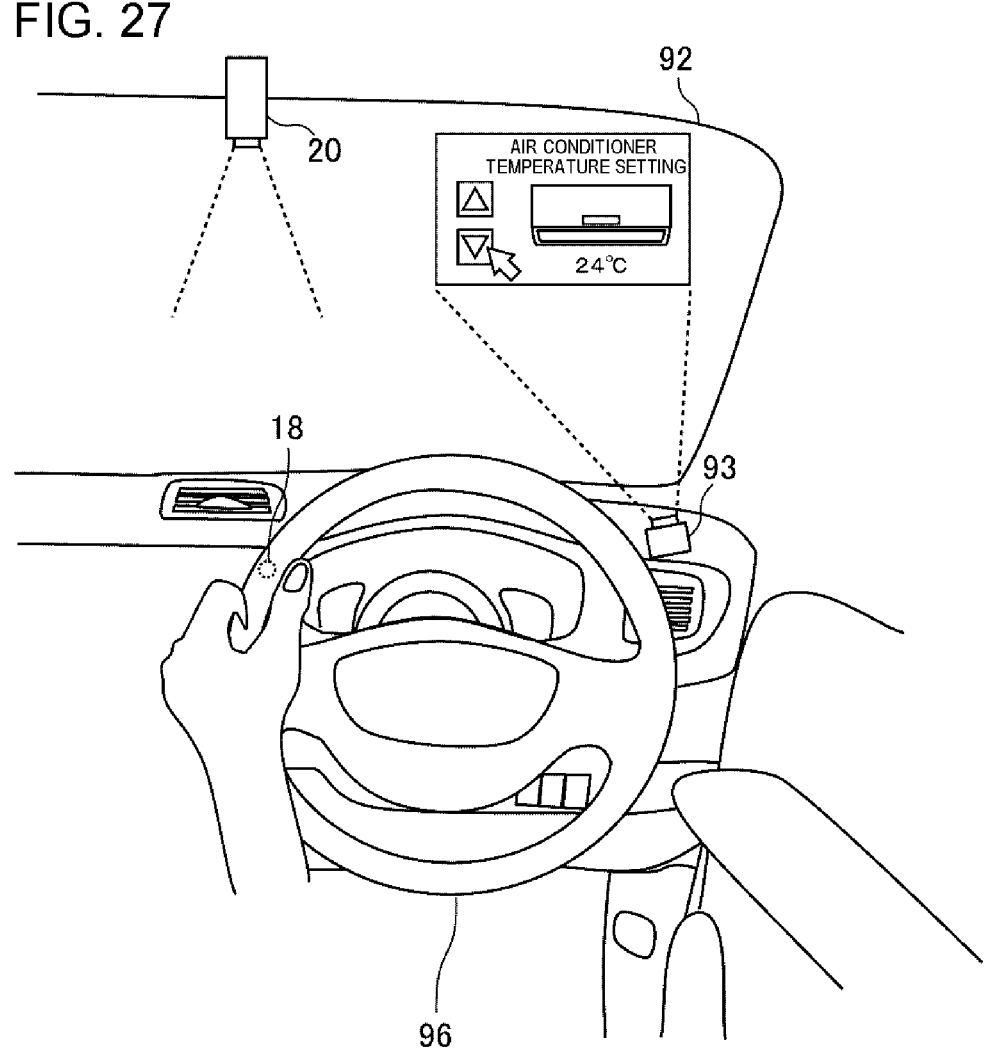
FIG. 27 is a diagram illustrating a case where a device 10 is not used.

FIG. 27 is a diagram illustrating a case where the device 10 is not used. In this case, the information processing apparatus 2000 is built into, for example, the automobile 90. The recognition unit 2040 acquires vibration detected by the sensor 3040, and determines that the vibration is applied by the user in a case where vibration of a predetermined magnitude or more is detected. The recognition unit 2040 handles a timing at which the vibration is applied, or a time point corresponding to a predetermined time before or after the timing as a detection target timing.

Note that in a case where a vibration sensor is provided in the automobile 90, it is preferable to differentiate vibration applied to the vibration sensor by the user from vibration applied to the vibration sensor due to steady vibration of the automobile 90 caused by vibration of an engine from. To do so, for example, data indicating a pattern of the steady vibration of the automobile 90 caused by vibration of the engine is stored in a storage device. The recognition unit 2040 filters the pattern of the steady vibration from vibration detected by the sensor 3040, and detects vibration of a predetermined magnitude or more with respect to the filtered vibration. The recognition unit 2040 recognizes an input operation in a case where vibration of the predetermined magnitude or more is detected from the filtered vibration. In the above-described way, it is possible to prevent the recognition unit 2040 from recognizing an input operation due to the steady vibration of the automobile 90. In other words, it is possible to prevent an input operation from being wrongly detected.

For example, in a case where a vibration sensor is provided in the automobile 90, the information processing system 3000 may be configured not to recognize an input operation while steady vibration caused by vibration of the engine is detected by the sensor 3040. For example, as described above, data indicating a pattern of the steady vibration of the automobile 90 caused by vibration of the engine is stored in a storage device. While the pattern of the steady vibration is detected, the recognition unit 2040 does not recognize an input operation even if vibration of a predetermined magnitude or more is detected.

As mentioned above, the input operation is recognized when the engine is stopped by the information processing system 3000 which does not recognize an input operation while steady vibration caused by vibration of the engine is detected by the sensor 3040. Here, in a case where an idling stop function is provided in the automobile 90, the engine of the automobile 90 is stopped while the automobile is stopping or during traffic light waiting. Therefore, in a case where the engine of the automobile 90 is not started, or the idling stop function works, that is, the automobile 90 is not moved, the information processing system 3000 receives an input operation. In the above-described way, the user can more safely use the information processing system 3000. Note that the automobile 90 may not have the idling stop function.

Note that, even in a case where the sensor 3040 is provided in the automobile 90 or the like, the sensor 3040 is not limited to a vibration sensor. For example, in a case where the sensor 3040 is an electrostatic capacitance sensor, the user touches a location where the sensor 3040 is provided, and thus the sensor 3040 detects a change in electrostatic capacitance. For example, in a case where the sensor 3040 is a pressure sensor, the user applies pressure to a location where the sensor 3040 is provided, and thus the sensor 3040 detects the pressure.

Hereinafter, examples of reference embodiments are added.

1. An information processing system comprising:
a marker being attached to a user or being a part of the body of the user;
a sensor being attached to the user; and
an information processing apparatus,
wherein the information processing apparatus includes:
an operation region calculation unit calculating an operation region included in a captured image on the basis of a position of the marker included in the captured image generated by a camera; and
a recognition unit detecting a position of an operation body captured in the operation region at a timing based on a result of detection by the sensor or detecting motion of the operation body captured in the operation region in a period including the timing, and recognizing an input operation on the basis of the detected position or motion.

2. The information processing system according to 1.,
wherein the marker is attached to an arm portion of the user, and
wherein the operation body is a part of the arm portion or is an object held by the arm portion.

3. The information processing system according to 2.,
wherein the marker is attached to the wrist included in the arm portion, and
wherein the operation region calculation unit calculates the operation region to include a position separated from a position of the marker in a direction of the palm included in the arm portion by a predetermined distance.

4. The information processing system according to any one of 1. to 3.,
wherein the marker is an image displayed on a display of a device attached to the user, and
wherein the sensor is provided in the device.

5. The information processing system according to any one of 1. to 4., further comprising an output apparatus outputting a screen,
wherein the information processing apparatus further includes an output control unit controlling the output apparatus to output a screen including an operation target of an input operation recognized by the recognition unit.

6. The information processing system according to 5., wherein the output apparatus is provided in a vehicle so as to output the screen to a region overlapping a part of a window of the vehicle.

7. The information processing system according to 6., wherein the screen output from the output apparatus by the output control unit is an operation screen for operating a device installed in the vehicle.

8. An information processing apparatus comprising:
an operation region calculation unit calculating an operation region included in a captured image on the basis of a position of a marker included in the captured image generated by a camera; and
a recognition unit that detecting a position of an operation body captured in the operation region at a timing based on a result of detection by a sensor or detecting motion of the operation body captured in the operation region in a period including the timing, and recognizing an input operation on the basis of the detected position or motion,
wherein the marker is attached to a user or is a part of the body of the user, and
wherein the sensor is attached to the user.

9. The information processing apparatus according to 8.,
wherein the marker is attached to an arm portion of the user, and
wherein the operation body is a part of the arm portion or is an object held by the arm portion.

10. The information processing apparatus according to 9.,
wherein the marker is attached to the wrist included in the arm portion, and
wherein the operation region calculation unit calculates the operation region to include a position separated from a position of the marker in a direction of the palm included in the arm portion by a predetermined distance.

11. The information processing apparatus according to any one of 8. to 11.,
wherein the marker is an image displayed on a display of a device attached to the user, and
wherein the sensor is provided in the device.

12. The information processing apparatus according to any one of 8. to 11., further includes an output control unit controlling an output apparatus to output a screen including an operation target of an input operation recognized by the recognition unit.

13. The information processing apparatus according to 12., wherein the output apparatus is provided in a vehicle so as to output the screen to a region overlapping a part of a window of the vehicle.

14. The information processing apparatus according to 13., wherein the screen output from the output apparatus by the output control unit is an operation screen for operating a device installed in the vehicle.

15. A control method executed by a computer, including:
an operation region calculation step of calculating an operation region included in a captured image on the basis of a position of a marker included in the captured image generated by a camera; and
a recognition step of detecting a position of an operation body captured in the operation region at a timing based on a result of detection by a sensor or detecting motion of the operation body captured in the operation region in a period including the timing, and recognizing an input operation on the basis of the detected position or motion,
wherein the marker is attached to a user or is a part of the body of the user, and
wherein the sensor is attached to the user.

16. The control method according to 15.,
wherein the marker is attached to an arm portion of the user, and
wherein the operation body is a part of the arm portion or is an object held by the arm portion.

17. The control method according to 16.,
wherein the marker is attached to the wrist included in the arm portion, and
wherein in the operation region calculation step, calculating the operation region to include a position separated from a position of the marker in a direction of the palm included in the arm portion by a predetermined distance.

18. The control method according to any one of 15. to 17.,
wherein the marker is an image displayed on a display of a device attached to the user, and
wherein the sensor is provided in the device.

19. The control method according to any one of 15. to 18., further including an output control step of controlling an output apparatus to output a screen including an operation target of an input operation recognized by the recognition unit.

20. The control method according to 19., wherein the output apparatus is provided in a vehicle so as to output the screen to a region overlapping a part of a window of the vehicle.

21. The control method according to 20., wherein the screen which is output from the output apparatus in the output control step is an operation screen for operating a device installed in the vehicle.

22. A program causing a computer to execute:
an operation region calculation step of calculating an operation region included in a captured image on the basis of a position of a marker included in the captured image generated by a camera; and
a recognition step of detecting a position of an operation body captured in the operation region at a timing based on a result of detection by a sensor or detecting motion of the operation body captured in the operation region in a period including the timing, and recognizing an input operation on the basis of the detected position or motion,
wherein the marker is attached to a user or is a part of the body of the user, and
wherein the sensor is attached to the user.

23. The program according to 22.,
wherein the marker is attached to an arm portion of the user, and
wherein the operation body is a part of the arm portion or is an object held by the arm portion.

24. The program according to 23.,
wherein the marker is attached to the wrist included in the arm portion, and
wherein in the operation region calculation step, calculating the operation region to include a position separated from a position of the marker in a direction of the palm included in the arm portion by a predetermined distance.

25. The program according to any one of 22. to 24.,
wherein the marker is an image displayed on a display of a device attached to the user, and
wherein the sensor is provided in the device.

26. The program according to any one of 15. to 18., further causing the computer to execute an output control step of controlling an output apparatus to output a screen including an operation target of an input operation recognized by the recognition unit.

27. The program according to 26., wherein the output apparatus is provided in a vehicle so as to output the screen to a region overlapping a part of a window of the vehicle.

28. The program according to 29., wherein the screen which is output from the output apparatus in the output control step is an operation screen for operating a device installed in the vehicle.

This application is based upon and claims the benefit of priority from Japanese Patent Application No. 2016-021575, filed Feb. 8, 2016; the entire contents of which are incorporated herein by reference.

What is claimed is:

1. An information processing system comprising:
a marker attached to a user or being a part of the body of the user;
a sensor attached to the user;
an information processing apparatus; and
an output apparatus outputting a screen,
wherein the information processing apparatus includes:
an operation region calculation unit calculating an operation region included in a captured image generated by a camera on the basis of a position of the marker included in the captured image;
a recognition unit detecting a position of an operation body captured in the operation region at a timing based on a result of detection by the sensor or detecting motion of the operation body captured in the operation region in a period including the timing, and recognizing an input operation on the basis of the detected position or motion; and
an output control unit controlling the output apparatus to output a screen including information regarding an operation target of an input operation recognized by the recognition unit, and
wherein the output apparatus is provided in a vehicle so as to output the screen to a region overlapping a part of a window of the vehicle.

2. The information processing system according to claim 1,
wherein the marker is attached to an arm portion of the user, and
wherein the operation body is a part of the arm portion or is an object held by the arm portion.

3. The information processing system according to claim 2,
wherein the marker is attached to the wrist included in the arm portion, and
wherein the operation region calculation unit calculates the operation region to include a position separated from a position of the marker in a direction of the palm included in the arm portion by a predetermined distance.

4. The information processing system according to claim 1,
wherein the marker is an image displayed on a display of a device attached to the user, and
wherein the sensor is provided in the device.

5. The information processing system according to claim 1, wherein the screen output from the output apparatus by the output control unit is an operation screen for operating a device installed in the vehicle.

6. An information processing apparatus comprising:
an operation region calculation unit calculating an operation region included in a captured image generated by a camera on the basis of a position of a marker included in the captured image;
a recognition unit that detecting a position of an operation body captured in the operation region at a timing based on a result of detection by a sensor or detecting motion of the operation body captured in the operation region in a period including the timing, and recognizing an input operation on the basis of the detected position or motion; and an output control unit controlling an output apparatus to output a screen including information regarding an operation target of an input operation recognized by the recognition unit, wherein the marker is attached to a user or is a part of the body of the user, wherein the sensor is attached to the user, and wherein the output apparatus is provided in a vehicle so as to output the screen to a region overlapping a part of a window of the vehicle.

7. A control method executed by a computer, comprising:

calculating an operation region included in a captured image generated by a camera on the basis of a position of a marker included in the captured image;

detecting a position of an operation body captured in the operation region at a timing based on a result of detection by a sensor or detecting motion of the operation body captured in the operation region in a period including the timing, and recognizing an input operation on the basis of the detected position or motion; and controlling an output apparatus to output a screen including an operation target of an input operation recognized by the recognition unit, wherein the marker is attached to a user or is a part of the body of the user, wherein the sensor is attached to the user, and wherein the output apparatus is provided in a vehicle so as to output the screen to a region overlapping a part of a window of the vehicle.

8. A non-transitory computer-readable storage medium storing a program causing a computer to execute:

calculating an operation region included in a captured image generated by a camera on the basis of a position of a marker included in the captured image;

detecting a position of an operation body captured in the operation region at a timing based on a result of detection by a sensor or detecting motion of the operation body captured in the operation region in a period including the timing, and recognizing an input operation on the basis of the detected position or motion; and controlling an output apparatus to output a screen including information regarding an operation target of an input operation recognized by the recognition unit, motion, wherein the marker is attached to a user or is a part of the body of the user, wherein the sensor is attached to the user, and wherein the output apparatus is provided in a vehicle so as to output the screen to a region overlapping a part of a window of the vehicle.

* * * * *